(12) United States Patent
Kharas

(10) Patent No.: US 8,809,225 B2
(45) Date of Patent: Aug. 19, 2014

(54) IRON-BASED FISCHER-TROPSCH CATALYST

(71) Applicant: Karl C. Kharas, South Bound Brook, NJ (US)

(72) Inventor: Karl C. Kharas, South Bound Brook, NJ (US)

(73) Assignee: Rentech, Inc, Los Angeles, CA (US)

( * ) Notice: Subject to any disclaimer, the term of this patent is extended or adjusted under 35 U.S.C. 154(b) by 93 days.

(21) Appl. No.: 13/652,005

(22) Filed: Oct. 15, 2012

(65) Prior Publication Data

US 2013/0109561 A1    May 2, 2013

Related U.S. Application Data

(60) Provisional application No. 61/551,579, filed on Oct. 26, 2011.

(51) Int. Cl.
| | |
|---|---|
| *B01J 23/70* | (2006.01) |
| *B01J 23/72* | (2006.01) |
| *B01J 23/74* | (2006.01) |
| *C07C 27/00* | (2006.01) |
| *C07C 27/06* | (2006.01) |
| *C01G 3/02* | (2006.01) |
| *B01J 35/00* | (2006.01) |
| *C01G 49/08* | (2006.01) |
| *B01J 23/745* | (2006.01) |
| *B01J 38/02* | (2006.01) |
| *C10G 2/00* | (2006.01) |
| *B01J 37/08* | (2006.01) |
| *B01J 37/03* | (2006.01) |
| *B01J 38/04* | (2006.01) |
| *B01J 23/06* | (2006.01) |
| *B01J 27/22* | (2006.01) |
| *B01J 23/78* | (2006.01) |
| *B01J 35/08* | (2006.01) |
| *B01J 37/00* | (2006.01) |
| *B01J 35/02* | (2006.01) |
| *B01J 37/06* | (2006.01) |

(52) U.S. Cl.
CPC . *B01J 23/06* (2013.01); *C01G 3/02* (2013.01); *B01J 35/002* (2013.01); *B01J 35/08* (2013.01); *C01G 49/08* (2013.01); *B01J 23/745* (2013.01); *B01J 38/02* (2013.01); *C01P 2002/74* (2013.01); *B01J 37/0045* (2013.01); *C10G 2/00* (2013.01); *B01J 35/023* (2013.01); *B01J 37/009* (2013.01); *C01P 2002/72* (2013.01); *B01J 37/06* (2013.01); *B01J 37/08* (2013.01); *C01P 2004/61* (2013.01); *B01J 37/031* (2013.01); *B01J 38/04* (2013.01); *C01P 2002/52* (2013.01); *C01P 2004/32* (2013.01); *B01J 27/22* (2013.01); *B01J 23/78* (2013.01); *C01P 2002/54* (2013.01)
USPC ............ 502/331; 502/338; 518/719; 518/721

(58) Field of Classification Search
USPC ........................... 502/331, 338; 518/719, 721
See application file for complete search history.

(56) References Cited

U.S. PATENT DOCUMENTS

| | | | |
|---|---|---|---|
| 2,758,128 A * | 8/1956 | Rottig et al. ................... | 518/713 |
| 4,172,842 A | 10/1979 | Schlinger et al. | |
| 4,289,746 A * | 9/1981 | Hayakawa et al. ........... | 423/633 |
| 4,994,428 A | 2/1991 | Bell et al. | |
| 5,508,118 A | 4/1996 | Hayashi et al. | |
| 6,627,666 B1 | 9/2003 | Pedersen | |
| 7,199,077 B2 * | 4/2007 | Hu et al. ........................ | 502/325 |
| 7,220,366 B2 * | 5/2007 | Uegami et al. ................ | 252/181 |
| 7,879,756 B2 | 2/2011 | Demirel et al. | |
| 2004/0009871 A1* | 1/2004 | Hu et al. ........................ | 502/338 |
| 2009/0062108 A1 | 3/2009 | Demirel et al. | |
| 2009/0075814 A1 | 3/2009 | Duvenhage et al. | |
| 2009/0298678 A1 | 12/2009 | Demirel et al. | |
| 2010/0311570 A1 | 12/2010 | Duvenhage et al. | |
| 2011/0213042 A1 | 9/2011 | Labuschagne | |

FOREIGN PATENT DOCUMENTS

| | | | | |
|---|---|---|---|---|
| JP | 2008006406 | | 1/2008 | |
| WO | 2013/062803 | * | 5/2013 | ............... B01J 23/06 |

OTHER PUBLICATIONS

"Catalytic performance on iron-based Fischer Tropsch catalyst in fixed-bed and bubbling fluidized-bed reactor," Suk-Hwan Kang et al. Applied Catalysis B: Environmental 103 (2011), pp. 169-180.*

"A-olefin selectivity of Fe-Cu-K catalysts in Fischer-Tropsch synthesis: Effects of catalyst composition and process conditions," Seyma-Ozkara-Aydinoglu, et al. Chemical Engineering Journal 181-182 (2012), pp. 581-589.*

"Study of phase transformation and catalytic performance on precipitated iron-based catalyst for Fischer-Tropsch synthesis," Mingyue Ding et al. Journal of Molecular Catalysis A: Chemical 303 (2009), pp. 65-71.*

Search Report and Written Opinion dated Mar. 21, 2013 for International Application No. PCT/US2012/060242 (7 pgs.).

* cited by examiner

*Primary Examiner* — Patricia L Hailey
(74) *Attorney, Agent, or Firm* — Timothy S. Westby; Porter Hedges, LLP

(57) ABSTRACT

An iron-based Fischer-Tropsch catalyst comprising magnetite and characterized by integrable X-ray diffraction reflections corresponding to (311), (511), (440), and (400), such that the relative intensity of the (400) reflection to the (300) reflection is less than about 39%. A method of preparing an activated iron-based Fischer-Tropsch catalyst by providing a precipitated catalyst comprising oxides including at least iron oxide; and activating the precipitated catalyst to provide the activated iron-based Fischer-Tropsch catalyst, wherein activating the precipitated catalyst comprises exposing the precipitated catalyst to an activation gas and increasing the temperature from a first temperature to a second temperature at a ramp rate, whereby the ratio of the intensity of the (400) reflection of the activated iron-based Fischer-Tropsch catalyst to the intensity of the (311) reflection thereof is less than 38%.

64 Claims, 4 Drawing Sheets

IRON-BASED FISCHER-TROPSCH CATALYST

CROSS-REFERENCE TO RELATED APPLICATIONS

This application claims the benefit under 35 U.S.C. §119(e) of U.S. Provisional Patent Application No. 61/551,579, filed Oct. 26, 2011, the disclosure of which is hereby incorporated herein by reference.

STATEMENT REGARDING FEDERALLY SPONSORED RESEARCH OR DEVELOPMENT

Not applicable.

BACKGROUND

1. Field of the Invention

This invention relates generally to the field of Fischer-Tropsch (FT) catalysts. More particularly, the invention relates to an iron-based Fischer Tropsch catalyst, and methods of preparing and utilizing same. Even more particularly, the invention relates to an iron-based Fischer Tropsch catalyst comprising substantially magnetite.

2. Background

The Fischer-Tropsch synthesis is considered an effective route for providing substitutes for liquid fossil fuels. Fischer-Tropsch (FT) synthesis catalytically converts synthesis gas, which is gas comprising hydrogen and carbon monoxide (also known as 'syngas'), to high molecular weight hydrocarbon products. The Fischer-Tropsch synthesis is catalyzed by numerous Fischer-Tropsch catalysts known in the art, and produces aliphatic hydrocarbons ranging from methane to paraffinic waxes having up to one hundred or more carbon atoms.

The synthesis gas converted via the Fischer-Tropsch synthesis is typically derived from coal or natural gas, and the synthesized liquid hydrocarbons may be further processed to provide desired chemicals, API weight fuels, etc. The choice of Fischer-Tropsch catalyst depends upon the molar ratio of hydrogen to carbon monoxide in the synthesis gas to be converted. The molar ratio is dependent upon the material from which the synthesis gas is produced, and the method utilized to produce the synthesis gas. Synthesis gas derived from natural gas typically has a molar ratio of hydrogen to carbon monoxide in the range of from about 1.8 to about 2.5, while synthesis gas derived from coal typically has a relatively lower molar ratio of hydrogen to carbon monoxide, generally in the range of from about 0.5 to about 1.7. It is thus generally desirable that Fischer-Tropsch catalyst utilized to synthesize hydrocarbons from coal-derived synthesis gas possess sufficient water gas shift (WGS) activity, whereby water and carbon monoxide are converted to hydrogen and carbon dioxide, thus providing additional hydrogen for the Fischer-Tropsch synthesis.

Iron-based Fischer-Tropsch catalysts promote the water gas shift reaction, thus making them attractive for use with coal-derived synthesis gas. Iron-based Fischer-Tropsch synthesis catalysts are typically prepared by precipitation of a water-soluble iron species, such as ferric nitrate, optionally in the presence of promoters such as potassium nitrate and cuprous nitrate, and binders such as silica. Calcination and activation are utilized to prepare the precipitated iron powder for utilization in the Fischer-Tropsch synthesis. Calcination of the precipitated iron powder typically comprises heating to convert metals to corresponding oxides, such as hematite ($Fe_2O_3$).

Activation of the calcined catalyst is generally performed by pretreatment, either outside the Fischer-Tropsch production reactor (ex situ) or within the production reactor (in situ), in the presence of an activation gas. The activation gas generally comprises either hydrogen, carbon monoxide, or both (i.e. or synthesis gas). Activation alters the catalyst composition to a more active form. The activity of the resultant catalyst is dependent upon the activation conditions, such as, but not limited to, the activation gas, the activation temperature profile, the activation pressure, and the flow rate of the activation gas. It has conventionally been believed that the active form of iron-based Fischer-Tropsch catalyst is a mixture of iron oxides, including hematite ($Fe_2O_3$), magnetite ($Fe_3O_4$), etc., iron carbides ($Fe_xC$, $2 \leq x \leq 3$), and iron metal ($\alpha$-Fe). Heretofore, no consensus exists relative to the nature of active iron-based Fischer-Tropsch catalysts and the phase or phases responsible for catalyzing the Fischer-Tropsch synthesis.

Accordingly, there is an outstanding need in the industry for methods of activating iron-based Fischer-Tropsch catalysts and activated iron-based Fischer-Tropsch catalysts that exhibit suitable activity and durability for prolonged Fischer-Tropsch synthesis.

SUMMARY

Disclosed herein is an iron-based Fischer-Tropsch catalyst comprising magnetite and characterized by integrable X-ray diffraction reflections corresponding to (311), (511), (440), and (400), such that the relative intensity of the (400) reflection to the (311) reflection is less than about 39%. In embodiments, the relative intensity of the (400) reflection to the (311) reflection is less than about 37%. In embodiments, the relative intensity of the (400) reflection to the (311) reflection is less than about 35%. In embodiments, the relative intensity of the (400) reflection to the (311) reflection is less than about 33%. In embodiments, the intensity of the (511) reflection, the (440) reflection, or both, relative to the (311) reflection is within the range expected for magnetite. In embodiments, the intensity of the (511) reflection relative to the (311) reflection is in the range of from about 24 to about 29, the intensity of the (440) reflection relative to the (311) reflection is in the range of from about 44 to about 68, or both. In embodiments, the iron-based Fischer-Tropsch catalyst further comprises $\chi$-$Fe_5C_2$. In embodiments, the iron-based Fischer-Tropsch catalyst has a deactivation rate of less than about 1%/week for at least 400 hours. In embodiments, the iron-based Fischer-Tropsch catalyst has a deactivation rate of less than about 1%/week for at least 700 hours.

In embodiments, the catalyst is a precipitated iron catalyst further comprising copper and potassium. In embodiments, the iron-based Fischer-Tropsch catalyst comprises, per 100 g Fe, from about 1 g to about 6 g copper. The iron-based Fischer-Tropsch catalyst may further comprise, per 100 g Fe, from about 1 g to about 6 g potassium. The iron-based Fischer-Tropsch catalyst may comprise, per 100 g Fe, from about 6 g to about 30 g silica.

In embodiments, the disclosed iron-based Fischer-Tropsch catalyst is operable to provide more than 1000 hours of catalytic activity on stream, with a carbon monoxide conversion of at least 85%. In embodiments, the iron-based Fischer-Tropsch catalyst is operable to produce Fischer-Tropsch synthesis products with an average alpha value of at least 0.95. In embodiments, the iron-based Fischer-Tropsch catalyst is operable to produce Fischer-Tropsch synthesis products with a carbon dioxide selectivity of less than 40 mole percent (±3 mole percent). In embodiments, the iron-based Fischer-Tropsch catalyst is operable to produce Fischer-Tropsch synthesis products with a methane selectivity of less than 1.5 mole percent.

Also disclosed herein is a method of preparing an activated iron-based Fischer-Tropsch catalyst by providing a precipitated catalyst comprising oxides including at least iron oxide; and activating the precipitated catalyst to provide the activated iron-based Fischer-Tropsch catalyst, wherein activating the precipitated catalyst comprises exposing the precipitated catalyst to an activation gas, and increasing the temperature from a first temperature to a second temperature at a ramp rate, whereby the ratio of the intensity of the (400) reflection of the activated iron-based Fischer-Tropsch catalyst to the intensity of the (311) reflection thereof is less than 38%. In embodiments, the ratio of the intensity of the (400) reflection of the activated iron-based Fischer-Tropsch catalyst to the intensity of the (311) reflection thereof is less than about 37%. In embodiments, the ratio of the intensity of the (400) reflection of the activated iron-based Fischer-Tropsch catalyst to the intensity of the (311) reflection thereof is less than about 35%. In embodiments, the ratio of the intensity of the (400) reflection of the activated iron-based Fischer-Tropsch catalyst to the intensity of the (311) reflection thereof is less than about 33%. In embodiments, the ratio of the intensity of the (400) reflection of the activated iron-based Fischer-Tropsch catalyst to the intensity of the (311) reflection thereof is in the range of from 0% to 38%. In embodiments, the relative intensity of the (400) reflection of the activated iron-based Fischer-Tropsch catalyst to the intensity of the (311) reflection thereof is greater than or equal to about 18, 19, 20, 21, or 22%. In embodiments, the relative intensity of the (400) reflection of the activated iron-based Fischer-Tropsch catalyst to the intensity of the (311) reflection thereof is about 20%. In embodiments, the relative intensity of the (400) reflection of the activated iron-based Fischer-Tropsch catalyst to the intensity of the (311) reflection thereof is greater than 24%. In embodiments, the relative intensity of the (400) reflection of the activated iron-based Fischer-Tropsch catalyst to the intensity of the (311) reflection thereof is greater than 25%, indicating a contribution from a component other than magnetite. In embodiments, the relative intensity of at least one reflection selected from the group consisting of the (440) reflection and the (511) reflection of the activated iron-based Fischer-Tropsch catalyst to the intensity of the (311) reflection thereof is within the range expected for magnetite.

In embodiments of the disclosed method, the ramp rate is greater than 0.1° F./minute (0.06° C./minute). In embodiments, the ramp rate is in the range of from about 0.15° F./minute (0.08° C./minute) to about 1.5° F./minute (0.83° C./minute). In embodiments, the ramp rate is in the range of from about 0.2° F./minute (0.11° C./minute) to about 1° F./minute (0.56° C./minute). In embodiments, the ramp rate is in the range of from about 0.2° F./minute (0.11° C./minute) to about 0.9° F./minute (0.5° C./minute). The second temperature may be in the range of from about 250° C. to about 290° C., from about 260° C. to about 280° C., or from about 265° C. to about 275° C., or may be about 270° C. The first temperature may be in the range of from about 210° C. to about 250° C.

In embodiments of the disclosed method, the activation gas is selected from the group consisting of carbon monoxide, hydrogen, and combinations thereof. In embodiments, the activation gas comprises synthesis gas having a molar ratio of hydrogen to carbon monoxide in the range of from about 0.7 to about 1.5. In embodiments, the activation gas comprises synthesis gas having a molar ratio of hydrogen to carbon monoxide of about 1.

In embodiments of the disclosed method, the precipitated catalyst is exposed to activation gas at a space velocity in the range of from about 1.5 mL/h/g catalyst to about 2.5 mL/h/g catalyst. In embodiments, the precipitated catalyst is exposed to activation gas at a space velocity in the range of from about 1.7 mL/h/g catalyst to about 2.0 mL/h/g catalyst. In embodiments, the precipitated catalyst is exposed to activation gas at a space velocity of about 1.8 mL/h/g catalyst.

The precipitated catalyst may further comprise potassium oxides, copper oxides, or both. Providing a precipitated catalyst may further comprise precipitating iron oxide and optionally copper oxide by combination of a precipitant with a solution selected from the group consisting of iron nitrate solutions, and solutions comprising both iron and copper nitrates. In embodiments, the precipitant is selected from basic solutions. The basic solution may be selected from the group consisting of sodium hydroxide, sodium carbonate, sodium bicarbonate, potassium hydroxide, potassium carbonate, and combinations thereof. In embodiments, the basic solution comprises sodium carbonate. Providing a precipitated catalyst may comprise preparing a solution comprising iron nitrate by dissolving iron metal in a liquid comprising water, nitric acid, or both. Providing a precipitated catalyst may comprise promoting the precipitated material with at least one promoter. The method may comprise washing the precipitated material prior to promotion thereof. Promoting the precipitated material may comprises combining the precipitated material with a promoter selected from the group consisting of compounds comprising potassium and compounds comprising silicon. In embodiments, the promoter comprises potassium, silica, or both. In embodiments, the promoter comprises fumed silica and potassium hydroxide.

In embodiments of the method, providing a precipitated catalyst comprising oxides including at least iron oxide further comprises drying the precipitated material, sizing the precipitated material, or both. Sizing the precipitated material may comprise spray drying the precipitated material, optionally subsequent to drying. In embodiments, the spray dried precipitated catalyst particles are substantially spherical, and have an average particle size in the range of from about 40 µm to about 50 µm.

Providing a precipitated catalyst comprising oxides including at least iron oxide may further comprise calcining the precipitated material, optionally subsequent to spray drying. In embodiments, calcining comprises increasing the temperature from a starting temperature to a first intermediate temperature at a starting ramp rate and holding at the first intermediate temperature for a first dwell time, increasing the temperature from the first intermediate temperature to a second intermediate temperature at a first intermediate ramp rate and holding at the second intermediate temperature for a second dwell time, increasing the temperature from the second intermediate temperature to a final temperature at a final ramp rate and holding at the final temperature for a third dwell time. In embodiments, the starting temperature is about room temperature, the first intermediate temperature is in the range of from about 130° C. to about 160° C., the second intermediate temperature is in the range of from about 190° C. to about 210° C., and the final temperature is in the range of from about 280° C. to about 320° C. In embodiments, at least one dwell time selected from the group consisting of the first dwell time, the second dwell time, and the third dwell time is in the range of from about 2 hours to about 6 hours. In embodiments, at least one ramp rate selected from the group consisting of the starting ramp rate, the first intermediate ramp rate, the second intermediate ramp rate, and the final ramp rate is in the range of from about 0.4° C. to about 0.6° C.

Also disclosed herein is an activated iron-based Fischer-Tropsch catalyst produced via the disclosed method. Such an activated iron-based Fischer-Tropsch catalyst may comprise, per 100 g iron, from about 3 g to about 7 g copper, from about 1 g to about 6 g potassium, from about 10 g to about 24 g silica, or any combination thereof. The activated iron-based Fischer-Tropsch catalyst may comprise 100Fe/5Cu/3.8K/12SiO$_2$ (w/w/w/w).

The foregoing has outlined rather broadly the features and technical advantages of the invention in order that the detailed description of the invention that follows may be better understood. Additional objects, embodiments, features and advantages of the invention will be apparent from the following detailed description of the invention and the appended claims. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings wherein.

NOTATION AND NOMENCLATURE

Figure 1:
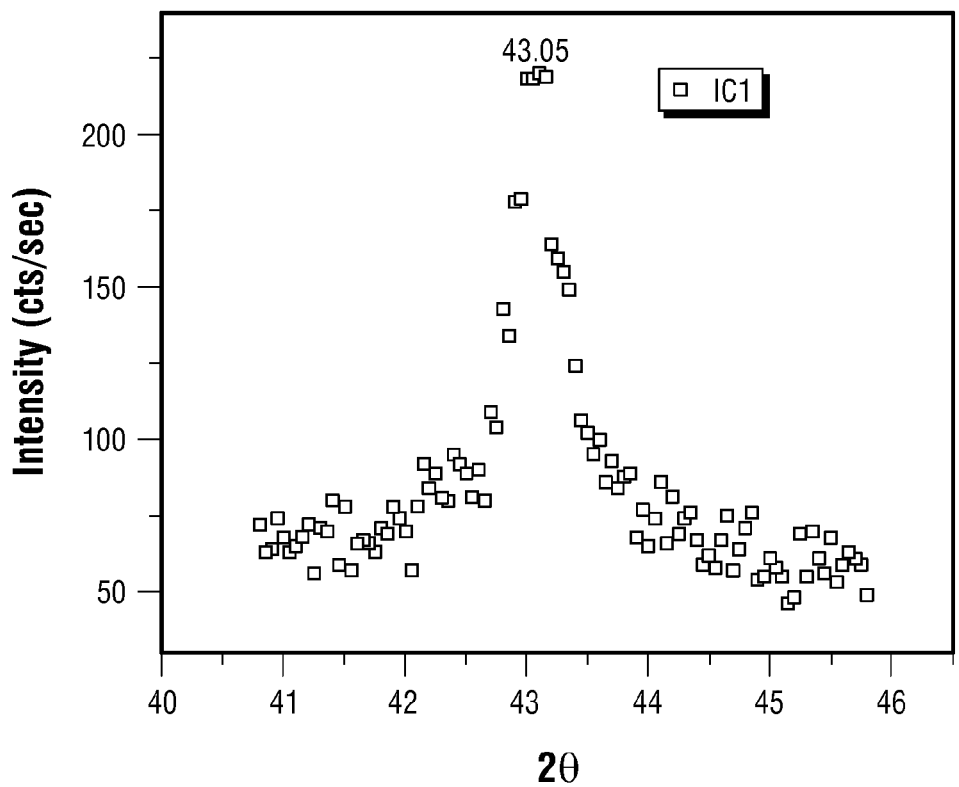
FIG. 1 is an X-ray diffraction pattern showing normalized intensity (counts per second) as a function of degree angle (2θ) for inventive catalyst IC1 according to an embodiment of this disclosure.

Certain terms are used throughout the following description and claims to refer to particular system components. This document does not intend to distinguish between components that differ in name but not function.

As used herein, the term 'χ-Fe$_5$C$_2$' is used to refer to χ-carbide, also known as chi carbide, Fe$_{2.5}$C, Fe$_5$C$_2$, or Hägg carbide.

As used herein, the phrase, 'deactivation rate' refers to the rate of decline of CO conversion in a Fischer-Tropsch reactor. CO conversion can be determined by methods known in the art, such as, by way of non-limiting example, by nitrogen balance. For example, one way of determining conversion is to determine the molar flow rates of carbon monoxide and of an inert gas, such as N$_2$ or Ar, that transit into and out of the Fischer-Tropsch reactor. CO conversion may then be calculated as $1-[(CO_{out})/(N_{2,out})]/[(CO_{in})/(N_{2,in})]$. When CO conversion is declining, the decline can be modeled, over short time periods, by a least squares regression. The slope of a least squares regression line can be calculated as percent of carbon monoxide conversion decline per hour. Percent carbon monoxide conversion (decline/hour) can be multiplied by 168, the number of hours in a week, to provide percent carbon monoxide decline per week, % CO conversion decline/week. The deactivation rate may be calculated once the CO conversion is less than a mean carbon monoxide conversion observed during the first 100 hours of time on stream (TOS).

As used herein, the phrase, 'stable performance' may be utilized to refer to a CO conversion deactivation rate of less than about 0.5 mole percent per week, less than 0.4 mole percent per week, less than 0.3 mole percent per week, or less than 0.2 mole percent per week.

Carbon dioxide selectivity is defined as the moles of CO$_2$ produced per the moles of CO converted.

The probability of hydrocarbon chain termination, α, is typically determined from the slope of a plot of the logarithm weight of hydrocarbons with n carbons, W$_n$, divided by n, the number of carbon atoms, against n−1: $\log(W_n/n)=(n-1)\log α+2 \log [n(α-1)]$. Although alpha, α, can also be estimated from the intercept of such a plot, the value provided by the slope is typically more precise.

DETAILED DESCRIPTION

I. Overview

Herein disclosed is a method for activating an iron-based Fischer-Tropsch catalyst and a catalyst produced via the disclosed method. It has been unexpectedly discovered that an iron-based Fischer-Tropsch catalyst comprising minimal excess magnetite (400) X-ray diffraction intensity after activation correlates with improved catalyst durability. As discussed in detail hereinbelow, the disclosed iron-based Fischer-Tropsch catalyst can be characterized by the relative intensity of an X-ray diffraction reflection that occurs at an angle consistent with magnetite (400). For catalyst durability, the intensity of this reflection must be limited to no more than a certain amount more than the intensity expected based on the contribution to this reflection provided by magnetite alone. It has been discovered that the amount of excess intensity of the relative (400) to (311) reflections correlates with catalyst durability, with more excess intensity being associated with more rapid catalyst deactivation, i.e. a less durable catalyst. Without wishing to be limited by theory, the formation, during activation, of relatively larger amounts of non-magnetite materials with reflections near magnetite (400) (e.g., possibly nanocrystalline χ-Fe$_5$C$_2$) negatively affects catalyst deactivation rate.

II. Iron-Based Fischer-Tropsch Catalyst

Herein disclosed is an iron-based Fischer-Tropsch catalyst comprising magnetite. The most intense magnetite reflection observed with X-ray diffraction is magnetite (311), while other magnetite reflections include magnetite (400), magnetite (440), and magnetite (511).

The relative intensities of the (400) to (311) reflections, along with deactivation rates and dwell times of a number of iron-based, precipitated Fischer-Tropsch catalysts were studied, and it was unexpectedly discovered that catalysts exhibiting stable performance had a (400)/(311) relative intensity of less than 39%. The expected relative intensity of magnetite (400)/(311) is 24 or 25%, depending on which JCPDS reference card is utilized. It was discovered that catalysts exhibiting less excess intensity at the angle of about 43.1° 2θ (for X-ray diffraction data collected with Cu Kα radiation), which corresponds to the reflection at (400) are significantly more durable, while iron-based Fischer-Tropsch catalysts having more excess intensity at this angle are substantially less durable.

The disclosed catalyst is characterized by integrable X-ray diffraction reflections corresponding to magnetite (311), (400), (440), and (511). The disclosed iron-based Fischer-Tropsch catalyst is characterized by a relative intensity of the (400) reflection to the (311) reflection that is less than about 39, 38, 37, 36, 35, 34, 33, or 32 percent. In embodiments, the disclosed catalyst is characterized by a relative intensity of magnetite (400) to magnetite (311) in the range of from about 20% to about 39%, from about 0% to about 38%, 37%, 36%, 35%, 34%, 33%, 32% or 31%, from about 10% to about 38%, 37%, 36%, 35%, 34%, 33%, 32% or 31%, from about 15% to about 38%, 37%, 36%, 35%, 34%, 33%, 32% or 31%, or from about 20% to about 38%, 37%, 36%, 35%, 34%, 33%, 32% or 31%. In embodiments, the iron-based Fischer-Tropsch catalyst of this disclosure is characterized by a (400) to (311) relative intensity that is in the range of from about 0% to about 37%, from about 20% to about 35%, or from about 20% to about 33%.

In embodiments, the catalyst of this disclosure exhibits a relative intensity of a reflection other than the (400) reflection to the (311) reflection that is within the expected range for magnetite. For example, in embodiments, the disclosed catalyst is further characterized by an intensity of the (511) reflection, the (440) reflection, or both, relative to the (311) reflection that is within the range expected for magnetite. According to JCPDS 00-019-0629, the expected relative intensity of the (440) to (311) reflections, when contributed solely by magnetite, is 68.0 percent. According to JCPDS 03-065-3107, the expected relative intensity of the (440) to (311) reflections, when contributed solely by magnetite, is 61.5 percent. According to a calculation using PowderCell, a program freely available over the internet to calculate diffraction patterns based on known structural parameters (e.g., the unit cell dimensions, space group, space group setting, and atomic fractional coordinates) the expected relative intensity ratio of the (440) to (311) reflections, when contributed solely by magnetite, is 44.1 percent. According to JCPDS 00-019-0629, 03-065-3107, and PowderCell calculations, the expected relative intensity of the (511) to (311) reflections, if contributed solely by magnetite, is in the range of from about 24% to about 29%.

In embodiments, the disclosed iron-based Fischer-Tropsch catalyst exhibits a relative intensity of the (511) reflection relative to the (311) reflection that is in the range of from about 20 to about 35 percent, from about 22 to about 30 percent, or from about 24 to about 29 percent. In embodiments, the disclosed iron-based Fischer-Tropsch catalyst exhibits a relative intensity of the (511) reflection relative to the (311) reflection that is about 22, 23, 24, 25, 26, 27, 28, 29, or 30 percent. In embodiments, the disclosed iron-based Fischer-Tropsch catalyst exhibits a relative intensity of the (440) reflection relative to the (311) reflection that is in the range of from about 40 to about 70 percent, from about 44 to about 68 percent, from about 44 to about 61 percent. In embodiments, the disclosed iron-based Fischer-Tropsch catalyst exhibits a relative intensity of the (440) reflection relative to the (311) reflection that is about 44%, 61% (e.g., 61.5%), 68%.

In embodiments, the iron-based Fischer-Tropsch catalyst further comprises $\chi$-$Fe_5C_2$, which may contribute excess apparent intensity at the (400) reflection.

The magnetite containing iron-based Fischer-Tropsch catalyst of this disclosure exhibits substantially more durability than iron-based catalyst characterized by a greater amount of excess (400) intensity. In embodiments, the disclosed iron-based Fischer-Tropsch catalyst initially exhibits a deactivation rate of less than about 5, 4, 3, 2, or 1 percent CO conversion per week. In embodiments, the catalyst exhibits a deactivation rate of less than about 5, 4, 3, 2, or 1% per week for at least 400, 500, 600, 700, or 800 hours.

In embodiments, the iron-based Fischer-Tropsch catalyst is a precipitated iron catalyst, which may be prepared as further described in Section III hereinbelow. In embodiments, the herein disclosed iron-based Fischer-Tropsch catalyst further comprises copper, potassium, and/or silica. In embodiments, the iron-based Fischer-Tropsch catalyst further comprises copper. In embodiments, the iron-based Fischer-Tropsch catalyst comprises, per 100 g Fe, from about 1 g to about 6 g copper from about 2.5 g to about 5 g copper, or from about 3.5 g to about 5 g copper.

In embodiments, the iron-based Fischer-Tropsch catalyst further comprises potassium. In embodiments, the iron-based Fischer-Tropsch catalyst further comprises, per 100 g Fe, from about 1 g to about 6 g potassium, from about 2 g to about 5 g potassium, or from about 4 g to about 5 g potassium.

In embodiments, the iron-based Fischer-Tropsch catalyst further comprises silica. In embodiments, the iron-based Fischer-Tropsch catalyst further comprises, per 100 g Fe, from about 6 g to about 30 g silica, from about 10 g to about 25 g silica, or from about 11 g to about 13 g silica.

In embodiments, the iron-based Fischer-Tropsch catalyst of this disclosure is operable to provide more than 500, 600, 700, 800, 900, or 1000 hours of catalytic activity on stream as defined by a CO conversion activity greater than or equal to about 45%, 50%, 55%, 60%, 65%, 70%, 75%, or 80%.

In embodiments, the disclosed iron-based Fischer-Tropsch catalyst is operable to produce Fischer-Tropsch synthesis products having an average alpha value, α, of at least or equal to about 0.8, 0.85, 0.9, or 0.95.

In embodiments, the disclosed iron-based Fischer-Tropsch catalyst is operable to produce Fischer-Tropsch synthesis products, with a carbon dioxide selectivity, conveniently defined as 1-(moles of $CO_2$ formed/hour)/(moles of CO converted/hr, (i.e. moles of $CO_2$ produced per moles of CO converted) of less than or equal to about 50±3%, 45±3%, 40±3%, 35±3%, or 30±3%.

In embodiments, the disclosed iron-based Fischer-Tropsch catalyst is operable to produce Fischer-Tropsch synthesis products, with a methane selectivity (i.e. moles of $CH_4$ produced per moles of CO converted) of less than or equal to about 2.5%, 2%, or 1.5%.

In embodiments, the disclosed catalyst has a particle size distribution in the range of from about 10 μm to about 150 μm. In embodiments, the catalyst exhibits a BET surface area in the range of from about 45 $m^2/g$ to about 250 $m^2/g$, or from about 45 $m^2/g$ to about 180 $m^2/g$. In embodiments, the catalyst has a mean pore diameter in the range of from about 45 Å to about 120 Å, or from about 75 Å to about 120 Å. In embodiments, the catalyst has a mean pore volume in the range of from about 0.2 cc/g to about 0.6 cc/g, or from about 0.20 cc/g to about 0.24 cc/g. In embodiments, the catalyst has a mean crystallite size in the range of from about 15 nm to about 40 nm, or from about 25 nm to about 29 nm.

III. Method of Producing Stable Iron-Based Fischer-Tropsch Catalyst

Also disclosed herein is a method of preparing an activated iron-based Fischer-Tropsch catalyst having enhanced stability for Fischer-Tropsch synthesis. It has been discovered that a catalyst as described hereinabove, having no more than the specified amount of excess (400)/(311) intensity can be formed by activating an iron-based Fischer-Tropsch catalyst under specific activation conditions, which will be further discussed hereinbelow. It has been unexpectedly discovered that a slow temperature ramp rate associated with catalyst activation correlates with inferior performance and more rapid deactivation. As discussed in the Examples section hereinbelow, a series of experiments was performed wherein the ramp rates and dwell times associated with catalyst activation were varied.

According to an embodiment of this disclosure, a method of preparing an activated iron-based Fischer-Tropsch catalyst comprises: providing a precipitated catalyst comprising oxides including at least iron oxide; and activating the precipitated catalyst to provide the activated iron-based Fischer-Tropsch catalyst, wherein activating the precipitated catalyst comprises exposing the precipitated catalyst to an activation gas and increasing the temperature from a first temperature to a second temperature at a ramp rate, whereby the ratio of the intensity of the (400) reflection of the activated iron-based Fischer-Tropsch catalyst to the intensity of the (311) reflection thereof is less than or equal to about 39%, 38%, 37%, 36%, 35%, 34%, 33%, or 32%.

In embodiments, the activation is carried out at temperatures, ramp rates, and/or dwell times appropriate to provide an activated, iron-based Fischer-Tropsch catalyst having ratio of the intensity of the (411) reflection thereof to the intensity of the (311) reflection thereof that is in the range of from 0% to about 38%. In embodiments, the relative intensity of the (400) reflection of the activated iron-based Fischer-Tropsch catalyst to the intensity of the (311) reflection thereof is greater than 22%, 23%, 24%, or 25%. In embodiments, the excess intensity (i.e. above 22%, 23%, 24%, or 25%) is attributable to a component other than magnetite.

In embodiments, the activation is carried out at temperatures, ramp rates, and/or dwell times appropriate to provide an activated, iron-based Fischer-Tropsch catalyst having a relative intensity of at least one reflection selected from the group consisting of the (440) reflection and the (511) reflection to the intensity of the (311) reflection that is within the range expected for this ratio when the reflection is due solely to magnetite. In embodiments, the activation provides an iron-based Fischer-Tropsch catalyst having a (440)/(311) relative intensity ratio that is in the range of from about 22% to about 68%, from about 44% to about 68%, or from about 44% to about 61%. In embodiments, the method of activation provides an iron-based Fischer-Tropsch catalyst having a (511)/(311) relative intensity ratio that is in the range of from about 12% to about 47%, from about 24% to about 47%, or from about 24% to about 40%.

It is preferred that samples be thick (i.e. at least 20 microns thick, preferably greater than 50 microns thick) and that samples mounted on zero background plates with small sample mass not be used to acquire intensity data. As is known to those skilled in the art, this leads to unexpectedly low intensities at high angle, e.g., at angles above about 50° or 55° 2θ.

In embodiments, the ramp rate is greater than or about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2, 2.5, 3, 3.5, 4, 4.5, 5, 6, 7, 8 or 9° F./minute (i.e. greater than or about 0.06, 0.11, 0.17, 0.22, 0.28, 0.33, 0.39, 0.45, 0.50, 0.56, 0.61, 0.67, 0.72, 0.78, 0.83, 0.89, 0.94, 1.0, 1.06, 1.11, 1.4, 1.7, 1.9, 2.2, 2.5, 2.8, 3.3, 3.9, 4.4 or 5° C./minute). In embodiments, the ramp rate is in the range of from about 0.15° F./minute (0.08° C./minute) to about 1.5° F./minute (0.83° C./minute). In embodiments, the ramp rate is in the range of from about 0.2° F./minute (0.11° C./minute) to about 1° F./minute (0.56° C./minute). In embodiments, the ramp rate is in the range of from about 0.2° F./minute (0.11° C./minute) to about 0.9° F./minute (0.5° C./minute). Faster ramps, for example, up to 0.9° F./min or more, may also provide suitably low (400)/(311) intensity ratios, although such high ramp rates may be operationally challenging.

In embodiments, the second temperature is in the range of from about 250° C. to about 290° C., from about 260° C. to about 280° C., or from about 265° C. to about 275° C. In embodiments, the second temperature is about 250° C., 255° C., 260° C., 265° C., 270° C., 275° C., 280° C., 285° C., or 290° C. In embodiments, the first temperature is in the range of from about 210° C. to about 250° C. In embodiments, the first temperature is about 210° C., 220° C., 230° C., 240° C., or 250° C.

In embodiments, the activation gas is selected from the group consisting of carbon monoxide, hydrogen, and combinations thereof (e.g., synthesis gas). In embodiments, the activation gas comprises synthesis gas having a molar ratio of hydrogen to carbon monoxide that is in the range of from about 0.4 to about 4, from about 0.5 to about 2, or from about 0.6 to about 1.5. In embodiments, the molar ratio of hydrogen to carbon monoxide is at least or equal to about 0.4, 0.5, 0.6, 2.5, 4, or 10. In embodiments, the molar ratio of hydrogen to carbon monoxide is in the range of from about 0.7 to about 1.5, from about 0.8 to about 1.4, from about 0.9 to about 1.3, or equal to about 0.7, 0.8, 0.9, 1.0, 1.1, 1.2, 1.3, 1.4, or 1.5.

In embodiments, the precipitated catalyst is exposed to activation gas at a space velocity in the range of from about 1.5 mL/h/g catalyst to about 2.5 mL/h/g catalyst, from about 1.6 mL/h/g catalyst to about 2.0 mL/h/g catalyst, or is equal to about 1.6, 1.7, 1.8, 1.9, 2.0, 2.1, 2.2, 2.3, 2.4 or 2.5 mL/h/g catalyst.

In embodiments, activation comprises introducing an inert gas into a reactor comprising a slurry of the catalyst at a first temperature; increasing the reactor temperature from the first temperature to a second temperature at a first ramp rate; introducing synthesis gas having a ratio of $H_2$:CO to the reactor at a space velocity; and increasing the reactor temperature from the second temperature to a third temperature at a second ramp rate. The second temperature may be in the range of from about 150° C. to about 250° C.; alternatively, the second temperature may be about 150° C. The third temperature may be in the range of from about 270° C. to about 300° C.; alternatively, the third temperature may be about 270° C. The reactor pressure may be maintained in the range of from about 0 psig to about 175 psig during activation; alternatively, in the range of from about 30 psig to about 140 psig. The first ramp rate may be in the range of from about 1° C./min to about 5° C./min. The second ramp rate may be in the range of from about 0.2° C./min to about 1° C./min; alternatively in the range of from about 0.5° C./min to about 1° C./min. The space velocity may be in the range of from about 3 to about 4 mL/h/g Fe. The molar ratio of $H_2$:CO may be in the range of from about 0.5 to about 1.5 during activation.

In embodiments, an iron Fischer-Tropsch catalyst is activated by introducing an inert gas into a reactor comprising a slurry of the catalyst at a first temperature, increasing the reactor temperature from the first temperature to a second temperature at a first ramp rate, wherein the second temperature is in the range of from about 150° C. to about 250° C., introducing synthesis gas having a desired molar ratio of $H_2$:CO to the reactor at a space velocity, and increasing the reactor temperature from the second temperature to a third temperature at a second ramp rate, wherein the third temperature is in the range of from about 270° C. to about 300° C. The reactor pressure may be maintained in the range of from about 0 psig to about 175 psig, or in the range of from about 30 psig to about 140 psig during activation. The first ramp rate may be in the range of from about 1° C./min to about 5° C./min. The second ramp rate may be in the range of from about 0.2° C./min to about 1° C./min. The space velocity may be in the range of from about 3 to about 4 mL/h/g Fe. The desired molar ratio of $H_2$:CO may be in the range of from about 0.5 to about 1.5. The second temperature may be about 150° C. The third temperature may be about 270° C.

In embodiments, activation is performed in synthesis gas at a temperature in the range of from about 150° C. to about 270° C. for a time period of from about 1 to about 10 hours. The synthesis gas may have a molar $H_2$:CO ratio in the range of from about 0.7 to about 1.5, from about 0.7 to about 1, or from about 0.77 to about 1. The space velocity for activation may be in the range of from about 1 to about 6 mL/h/g cat.

In embodiments, the precipitated catalyst further comprises at least one metal oxide in addition to iron oxides. For example, in embodiments, the precipitated catalyst further comprises potassium oxide(s), copper oxide(s), or both. In embodiments, the oxides that the precipitated material contains may comprise from about 90 to about 100 weight percent iron oxides, from about 0 to about 5 weight percent copper oxides, or from about 0 to about 5 weight percent potassium oxides.

The precipitated iron catalyst activated via the disclosed activation method may be any iron Fischer-Tropsch precipitate known in the art. In embodiments, the precipitated Fischer-Tropsch catalyst activated via the disclosed method is an iron-based precipitate formed as described in or having the composition of Fischer-Tropsch precipitate described in U.S. Pat. No. 5,508,118 and/or U.S. patent application Ser. No. 12/189,424 (now U.S. Pat. No. 7,879,756) filed Aug. 11, 2008; Ser. No. 12/198,459, filed Aug. 26, 2008; Ser. No. 12/207,859, filed Sep. 10, 2008; Ser. No. 12/474,552, filed May 29, 2009; and/or Ser. No. 12/790,101, filed May 28, 2010, the disclosure of each of which is hereby incorporated herein in its entirety for all purposes not contrary to this disclosure. Providing a precipitated catalyst comprising oxides including at least iron oxide can comprise providing an iron-based Fischer-Tropsch precipitate as described, for example, in any of the above-incorporated patent or patent applications.

In embodiments, providing a precipitated catalyst comprises precipitating iron oxide and optionally copper oxide by combination of a precipitant with a solution selected from the group consisting of iron nitrate solutions, and solutions comprising both iron and copper nitrates. In embodiments, the precipitant is selected from basic solutions. In embodiments, the basic solution is selected from sodium hydroxide, sodium carbonate, sodium bicarbonate, potassium hydroxide, potassium carbonate, and combinations thereof. In embodiments, the basic solution comprises sodium carbonate.

In embodiments, providing a precipitated catalyst further comprises preparing a solution comprising iron nitrate by dissolving iron metal in a liquid comprising water, nitric acid, or both. Providing a precipitated catalyst may further comprise promoting the precipitated material with at least one promoter. In embodiments, promoting the precipitated material further comprises combining the precipitated material with a promoter selected from the group consisting of compounds comprising potassium, and compounds comprising silicon. In embodiments, the promoter comprises potassium, silica, or both. In embodiments, the promoter comprises fumed silica and potassium hydroxide.

The method may further comprise washing the precipitated material prior to promotion thereof.

In embodiments, providing a precipitated catalyst comprising oxides including at least iron oxide further comprises drying the precipitated material, sizing the precipitated material, or both. Sizing the precipitated material can be performed by any methods known to those of skill in the art. For example, in embodiments, sizing is effected by spray drying the precipitated material, optionally subsequent to drying.

Spray drying may be performed by any methods known to those of skill in the art. In embodiments, a Niro dryer may be used to perform spray drying. Spray drying as defined herein, is the process of drying a liquid feed through a hot gas. In embodiments the catalyst slurry fed to the spray dryer is a solution, a colloid, or a suspension. In embodiments, the spray-dried catalyst particles are smooth, substantially round (or spherical) catalyst particles. In embodiments, the spray-dried catalyst particles are rough and/or non spherical, catalyst particles. Smooth, round particles may be particularly desirable because such particles may inhibit catalyst attrition due to increased particle density. Apart from contributing structural integrity, the presence of structural support/promoter (e.g., silica) in iron slurries may assist in spraying smooth, round catalyst particles. The density of sprayed particles depends upon the solids content of the feed to be spray-dried. In embodiments, the catalyst slurry to be spray-dried has a solids content in the range of from about 1% to about 50%. In embodiments, the catalyst slurry to be spray-dried has a solids content in the range of from about 10% to about 30%, or in the range of from about 0.5% to about 12.5%.

In embodiments, the spray dryer outlet temperature is controlled at a temperature in the range of from about 90° C. to about 200° C. or from about 90° C. to about 110° C. In embodiments, the spray dryer temperature is controlled at a temperature in the range of from about 95° C. to about 100° C. In some embodiments, the spray dryer temperature is controlled at a temperature in the range of from about 104° C. to about 108° C. In embodiments, the spray-dried particles have a Gaussian type particle size distribution (PSD). In embodiments, a precipitated catalyst slurry is spray dried to provide microspheric particles in the size range of from about 30 to about 100 micrometers, or in the range of from about 30 to about 90 micrometers. In embodiments, the mean particles size of the spray-dried catalyst is in the range of from about 30 to about 90 μm, from about 40 to about 50 μm, from about 30 to about 60 μm, from about 40 μm to about 150 μm, or from about 40 μm to about 100 μm. In embodiments, the mean particle size is in the range of from about 38 μm to about 80 μm. In embodiments, the mean particles size is in the range of from about 36 μm to about 48 μm. In embodiments, the spray-dried catalyst particles have an average particle size of about 80 micrometers. In embodiments, spray drying is performed such that the spray dried precipitated catalyst particles have an average particle size of about 30, 35, 40, 45, or 50 μm.

As mentioned hereinabove, spray drying can be performed with a Type H Mobil Niro Spray Dryer. Such a spray dryer comprises a two-fluid nozzle atomizer, drying chamber, air disperser, main chamber, product collection section, air ducts, cyclone, exhaust fan, air heater, and instrument panel. A feed slurry can be introduced to the spray dryer through a nozzle from the bottom, with drying air cross-flowing from the top. The feed slurry can comprise from about 10 to about 50 weight percent solids, from about 12 to about 30 weight percent solids, from about 20 to about 25 weight percent solids, or is equal to about 8, 9, 10, 11, 12, 13, 14, 15, 16, 17, 18, 19, 20, 21, 22, 23, 24 or 25 weight percent solids. In embodiments, the solids content of the slurry prior to addition of promoter is in the range of from about 10 wt % to about 20 wt %, or is equal to about 8, 9, 10, 11, 12, 13, 14, 15, 16, 17, 18, 19 or 20 wt %. In embodiments, the solids content of the slurry after addition of promoter is in the range of from about 10 wt % to about 20 wt %, or is equal to about 8, 9, 10, 11, 12, 13, 14, 15, 16, 17, 18, 19 or 20 wt %.

The spray drying conditions can comprise an inlet temperature in the range of from about 350° C. to about 450° C. or is equal to about 350° C., 360° C., 370° C., 380° C., 390° C., 400° C., 410° C., 420° C., 430° C., 440° C. or 450° C. The outlet temperature can be in the range of from about 70° C. to about 100° C., or about 70° C., 73° C., 75° C., 77° C., 80° C., 85° C., 90° C., 95° C., 96° C. The water setup flow can be about 4.0 to 4.5 kg/hr (feed flow can be set with water and subsequently switched to the actual slurry feed). The atomizer air flow can be about 1 bar with a 30% setting on a variable area flow meter. Coarse and fine samples can be collected.

In embodiments, providing a precipitated catalyst comprising oxides including at least iron oxide further comprises calcining the precipitated material, optionally subsequent to spray drying. To minimize aging, dried (e.g., spray dried) catalyst may be calcined immediately following spray drying, in embodiments. Calcining may be performed via any methods known to those of skill in the art. In embodiments, calcining comprises increasing the temperature from a starting temperature to a first intermediate temperature at a starting ramp rate and holding at the first intermediate temperature for a first dwell time, increasing the temperature from the first intermediate temperature to a second intermediate temperature at a first intermediate ramp rate and holding at the second intermediate temperature for a second dwell time, increasing the temperature from the second intermediate temperature to a final temperature at a final ramp rate and holding at the final temperature for a third dwell time. The starting temperature may be about room temperature, the first intermediate temperature may be in the range of from about 130° C. to about 160° C., the second intermediate temperature may be in the range of from about 190° C. to about 210° C., and the final temperature may be in the range of from about 280° C. to about 320° C. In embodiments, at least one dwell time selected from the group consisting of the first dwell time, the second dwell time, and the third dwell time is in the range of from about 2 hours to about 6 hours. In embodiments, at least one ramp rate selected from the group consisting of the starting ramp rate, the first intermediate ramp rate, the second intermediate ramp rate, and the final ramp rate is in the range of from about 0.4° C. to about 0.6° C.

In embodiments, the spray dried catalyst is calcined at a temperature in the range of from about 200° C. to about 600° C., from about 280° C. to about 600° C., from about 300° C. to about 600° C., or from about 200° C. to about 400° C. In embodiments, spray dried catalyst is calcined at a temperature in the range of from about 300° C. to about 380° C. In embodiments, spray dried catalyst is calcined at a temperature of about 300° C. In embodiments, spray dried catalyst is calcined at a temperature of about 320° C. In embodiments, spray dried catalyst is calcined at a temperature of about 380° C. Calcination may be performed for a time period in the range of from about 4 to about 10 hours. In embodiments, the spray dried catalyst is calcined by heating to a temperature of about 380° C. by heating at a rate of 30° C. per minute, and calcining for 4 hours. In embodiments, the spray dried catalyst is calcined by heating to a temperature of about 380° C. by heating at a rate of about 1° C. per minute, and calcining for 4 hours. In embodiments, the spray dried catalyst is calcined by heating to a temperature of about 300° C. by heating at a rate of from about 0.5° C. per minute to about 2° C. per minute. The spray dried catalyst may be calcined at the calcination temperature for about 4 hours. In embodiments, the spray dried catalyst is calcined by heating to a calcination temperature by heating at a rate in the range of from about 1° C. to about 30° C. per minute and calcined for a calcination duration. In embodiments, the heating rate is in the range of from about 0.5° C./min to about 25° C./min, from about 1° C./min to about 20° C./min, or from about 1° C./min to about 15° C./min, from about 1° C./min to about 10° C./min, from about 1° C./min to about 9° C./min, or from about 1° C./min to about 8° C./min, 7° C./min, 6° C./min, 5° C./min, 4° C./min, 3° C./min or 2° C./min. In embodiments, the spray dried catalyst is calcined in an oven or in a calciner, in atmosphere. As known in the art, spray dried catalyst may be calcined, for example, in a porcelain crucible.

In embodiments, the precipitated particles are stabilized (prestabilized) by heating to a temperature lower than the calcination temperature prior to calcination. In embodiments, the spray dried catalyst is prestabilized at a temperature below the temperature at which phase related changes/structuring take place [this may, for example, be determined by differential temperature analysis (DTA) over a temperature range, for example room temperature (RT) to about 550° C.].

In embodiments, the spray dried catalyst is prestabilized at a temperature below this phase change temperature prior to calcination. In embodiments, water is used sparingly to inhibit shrinking of the catalyst on drying. In embodiments, a stepwise increase in calcination temperature is used to prevent/minimize reduction in surface area. For instance, in embodiments, the catalyst is prestabilized by heating at a first (relatively low) temperature prior to calcination at a (relatively high) calcination temperature. In embodiments, the catalyst is prestabilized at a temperature in the range of from about 100° C. to about 150° C. In embodiments, the spray dried catalyst is prestabilized at a temperature in the range of from about 120° C. to about 150° C. In embodiments, spray dried catalyst is prestabilized overnight, before increasing to full calcination conditions, to set the catalyst structure. Without wishing to be limited by theory, prestabilizing the precipitated catalyst at a lower temperature prior to calcination may minimize pore loss to a loss of micropores upon calcining, resulting in improved catalyst surface area.

In specific embodiments the catalyst is prestabilized at 140° C. for 4 hours, the temperature is increased at a rate in the range of from about 0.5° C./min to about 2° C./min to a temperature of greater than about 200° C., and the catalyst calcined for 4 hours, the temperature is then increased at a rate in the range of from about 0.5° C./min to about 2° C./min, and the catalyst calcined at 300° C. for 4 hours. In some embodiments, the catalyst is calcined at a temperature of about 320° C. for a period of about 4 hours. In certain embodiments, the catalyst is calcined at a temperature of about 350° C. for a period of about 4 hours. In other embodiments, the catalyst is calcined at a temperature of up to or equal to about 380° C., 400° C., 500° C. or 600° C. for a period of about 4 hours.

In embodiments, calcining comprises (a) increasing the temperature to 140° C. (from, for example room temperature) at a rate of about 0.5° C./min and dwelling for 4 hours at this temperature; (b) increasing from 140° C. to 200° C. at a rate of about 0.5° C./min and dwelling for 4 hours at this temperature; (c) increasing from 200° C. to 300° C. at a rate of about 0.5° C./min and dwelling for 4 hours at this temperature; and (d) decreasing to a temperature of about 70° C. at a rate of about 5° C./min, or a any combination of one or more of steps (a)-(d).

Also disclosed herein is an activated iron-based Fischer-Tropsch catalyst produced via the disclosed method. The activated iron-based Fischer-Tropsch catalyst may comprise, per 100 g iron, from about 3 g to about 7 g copper, from about 3.5 g to about 6 g copper, or from about 4 g to about 5.5 g copper. The activated iron-based Fischer-Tropsch catalyst may comprise, per 100 g iron, from about 1 g to about 6 g potassium, from about 2 g to about 5.5 g potassium, or from about 3 g to about 5 g potassium. The activated iron-based Fischer-Tropsch catalyst may comprise, per 100 g iron, from about 6 g to about 35 g silica, from about 10 g to about 24 g silica, or from about 11 g to about 13 g silica. In embodiments, the activated iron-based Fischer-Tropsch catalyst comprises Fe/5Cu/3.8K/12SiO$_2$ (w/w/w/w), Fe/5Cu/3.8K/24SiO$_2$ (w/w/w/w), Fe/5Cu/5K/12SiO$_2$ (w/w/w/w), or Fe/3Cu/3.8K/12SiO$_2$ (w/w/w/w). In embodiments, the disclosed catalyst comprises iron, copper and potassium in a weight ratio of 100Fe/1Cu/1K (wt %:wt %:wt %). The catalyst may comprise about 98% iron oxides, about 1% copper oxides and/or about 1% potassium oxides.

As determined, for example, via inductively coupled plasma atomic emission spectroscopy, ICP-AES, which is often used when the analyte mass fraction is greater than about 100 or 500 ppm, the disclosed catalyst may comprise iron in the range of from about 50 to about 60 weight percent, from about 52 to about 58 weight percent, or from about 54 to about 57 weight percent. The catalyst may further comprise copper in the range of from about 0 to about 5 weight percent, from about 1 to about 4 weight percent, or from about 2 to about 3 weight percent. The catalyst may further comprise potassium in the range of from about 0 to about 5 weight percent, from about 1 to about 4 weight percent, or from about 2 to about 3 weight percent. The catalyst may further comprise silica in the range of from about 0 to about 10 weight percent, from about 3 to about 9 weight percent, or from about 5 to about 8 weight percent.

IV. Method of Producing Fischer-Tropsch Hydrocarbons

Also disclosed herein is a method of producing liquid hydrocarbons via Fischer-Tropsch synthesis. The method comprises contacting a feed gas comprising synthesis gas (i.e. carbon monoxide and hydrogen) with an iron-based Fischer-Tropsch catalyst of this disclosure under suitable operating conditions as known in the art to be effective for the production of Fischer-Tropsch hydrocarbons. In embodiments, the molar ratio of H$_2$ to CO in the Fischer-Tropsch feed gas is in the range of from about 0.5 to about 10, from about 0.75 to about 5, from about 0.75 to about 3, from about 1 to about 3, from about 1.5 to about 3, from about 1.8 to about 2.5, from about 1.9 to about 2.2, or from about 2.05 to about 2.10. In embodiments, at least a portion of the feed gas comprises synthesis gas produced via partial oxidation, reforming of CO$_2$, steam reforming, autothermal reforming, gasification (e.g., coal gasification and/or biomass gasification), or a combination thereof. In embodiments, at least a portion of the feed gas comprises synthesis gas produced via steam reforming. Such synthesis gas from steam reforming may have a molar ratio of H$_2$ to CO of about 3. In embodiments, at least a portion of the feed gas comprises synthesis gas produced via partial oxidation. Such synthesis gas from partial oxidation may have a molar ratio of H$_2$ to CO of about 2. In embodiments, at least a portion of the feed gas comprises synthesis gas produced via autothermal reforming. Such synthesis gas from autothermal reforming may have a molar ratio of H$_2$ to CO of about 2.5. In embodiments, at least a portion of the feed gas comprises synthesis gas produced via reforming of CO$_2$. Such synthesis gas from reforming of CO$_2$ may have a molar ratio of H$_2$ to CO of about 1. In embodiments, at least a portion of the feed gas comprises synthesis gas produced via gasification. In embodiments, at least a portion of the feed gas comprises synthesis gas produced via gasification of coal. Such synthesis gas from (e.g., coal) gasification may have a molar ratio of H$_2$ to CO of about 1.

The feed gas may further comprise other components, including but not limited to CO$_2$ and/or H$_2$O, light hydrocarbons having from one to about four carbon atoms, or having one or two carbon atoms. In embodiments, the feed gas comprises from about 30 to about 95 volume percent CO, from about 40 to about 75 volume percent CO, or from about 50 to about 60 volume percent CO. In embodiments, the feed gas comprises from about 55 to about 95 volume percent H$_2$, from about 70 to about 95 volume percent H$_2$, or from about 80 to about 95 volume percent H$_2$. In embodiments, the feed gas further comprises, in addition to carbon monoxide and hydrogen (i.e. in addition to synthesis gas) from about 0 to about 40 volume percent CO$_2$, from about 0 to about 30 volume percent CO$_2$, or from about 0 to about 20 volume percent CO$_2$. The feed gas may further comprise from about 0 to about 80 volume percent light hydrocarbons, from about 1 to about 80 volume percent light hydrocarbons, or from about 1 to about 50 volume percent light hydrocarbons.

V. Features/Advantages

While it is known in the art that X-ray diffraction analysis can provide insight into catalyst performance, it has not been used to a high degree in Fischer-Tropsch catalysis. Careful comparison of integrated intensity of the magnetite (400) reflection with other magnetite reflections and analysis have been used herein to infer the differential contribution of a non-magnetite component (without limitation believed to be $\chi$-Fe$_5$C$_2$) to a reflection assigned as predominantly due to magnetite (400).

A durable, iron-based Fischer-Tropsch catalyst is disclosed herein, along with a method of forming such a catalyst. As mentioned hereinabove, the disclosed catalyst may exhibit over 1000 hours of activity on stream, at a carbon monoxide conversion of greater than 80%. The catalyst deactivation rate may be less than 1% per week when run under operating conditions comprising a synthesis gas feed rate of 1.80 liter/g catalyst-hr, a synthesis gas molar ratio of hydrogen to carbon monoxide of 1.0, an operating temperature of 255° C., and/or an operating pressure of about 350 psig. Also, as mentioned previously, the disclosed catalyst may exhibit an alpha value of greater than about 0.95, a carbon dioxide selectivity of less than about 40% (±3%), and/or a methane selectivity of less than about 1.5%.

EXAMPLES

The following example is presented to further illustrate the present invention and is not to be construed as unduly limiting the scope of this disclosure.

Example 1

Inventive catalysts according to this disclosure, and comparative catalysts were studied via X-ray diffraction. A supported, precipitated, iron-based Fischer-Tropsch catalyst promoted with copper and potassium was prepared utilizing elemental iron as starting material. As outlined in more detail hereinbelow, the basic steps of catalyst preparation comprised (1) preparing iron and copper nitrate solutions; (2) preparing sodium carbonate solution; (3) co-precipitating; (4) washing; (5) preparing promoter gel; (6) adding promoter gel; (7) drying and sizing; and (8) calcining.

The reagents utilized in catalyst production comprised 80.7 g of iron powder, Fe (Hoganas, 98.61% Fe, −325 mesh); 27.8 g of copper nitrate solution (14.5% Cu); 387.9 g of Certified ACS PLUS grade 70% nitric acid (Fisher); 242.04 g of 99.5+% ACS reagent grade sodium carbonate, $Na_2CO_3$; 9.900 g of 45 wt. % aqueous solution of potassium hydroxide, KOH (Sigma Aldrich); 9.700 g of synthetic, crystalline-free silicon dioxide (Cab-O-Sil® Untreated Fumed Silica; Monson); and DI water.

The iron-based catalyst was formed as follows: (1) 387.9 g of 70% $HNO_3$ was dissolved in 1162.3 mL DI water; (2) 80.7 g of iron powder was slurried with 464.5 mL of DI water and 27.8 g of copper nitrate solution was slowly (less than 15-20 mL/min) added to this slurry with mechanical stirring, such that the reaction temperature was maintained between 30° C. and 32° C.; (3) the mixture was stirred for approximately 30 minutes without heating; (4) the iron nitrate/copper nitrate solution was filtered to remove any undissolved material; (5) the solution was then heated to 70° C. at about 3° C./minute, and maintained at 70° C. for about 45 minutes; (6) a 115 g/L sodium carbonate solution containing 242.04 g of sodium carbonate and 2107.6 mL of DI water was prepared, and heated to 70° C.; (7) co-feeding of nitrate and carbonate solutions was performed at a substantially constant pH of 8.8 and a temperature of about 70° C., while both of the solution temperatures were at 70° C. to precipitate catalyst; (8) the mixture was then stirred at 70° C. for about 5 minutes, while maintaining a pH of 8.8±0.05; (9) the slurry was immediately removed to a filter unit and washed with DI water (approximately 100 L) until substantially free of sodium and nitrates (e.g., filtrate conductivity less than or equal to about 40±10 μmho); (10) the filter residue was sufficiently dried to facilitate removal from the filter paper; (11) promoter was prepared by slowly adding fumed silica, in portions, to the potassium hydroxide (dissolved in 40 mL of DI water), ensuring it was well dispersed and no lumps were formed, the promoter slurry was added to the iron slurry, and additional water was added to generate a 16-17 wt % solids mixture; (12) the mixture was spray dried to spherical particles with an average particle diameter in the range of from about 40 microns to about 50 microns (e.g., about 45 microns); and (13) the spray dried material was soon thereafter calcined to minimize aging.

Spray drying was performed with a Type H, Mobile Niro Spray Dryer comprising a two-fluid nozzle atomizer, drying chamber, air disperser, chamber, product collection section, air ducts, cyclone, exhaust fan, air heater, and instrument panel. The 'feed' slurry to be spray dried was introduced through a nozzle from the bottom, with the drying air cross flowing from the top. Spray drying conditions comprised an inlet temperature of 370° C. (±2° C.), an outlet temperature of 75° C. (±2.0° C.), a slurry solids content of 16% (±1%), a water setup flow in the range of from about 4.0 to 4.5 kg/hr (feed flow was set with water, and then switched to actual feed slurry), an atomizer air flow of 1 bar, with a 30% setting on a variable area flow meter. Spray drying produced a catalyst having a particle size distribution with less than 3% of the catalyst particles having a size of less than 20 microns, less than 15% of the catalyst particles having a size of less than 40 microns, and less than 5% of the catalyst having a size of larger than 80 microns.

The spray dried material was calcined as follows: (1) increasing the temperature from room temperature to 140° C. at 0.5° C./min., and dwelling at this temperature for 4 hours; (2) increasing the temperature from 140° C. to 200° C. at 0.5° C./min., and dwelling at this temperature for 4 hours; (3) increasing the temperature from 200° C. to 300° C. at 0.5° C./min., and dwelling at this temperature for 4 hours; and (4) decreasing the temperature to 70° C. at a rate of 5° C./min.

Physical Properties of Catalyst Precipitate.

The precipitated catalyst comprised a ratio of 100 Fe/5Cu/3.8K/12$SiO_2$ (w/w/w/w). The catalyst particles were substantially spherical in shape, with an average particle size of about 45 microns. TPR indicated a maximum reduction temperature at 240° C. The elemental analysis of the catalysis indicated iron in the range of 56% (±0.5), copper in the range of 2.8% (±0.2), potassium (K) in the range of 2.1% (±0.2), and silica in the range of 7% (±0.5), as analyzed by ICP.

Activation of Precipitated Catalyst.

Portions of the iron-based Fischer-Tropsch precipitated catalyst formed as described hereinabove were activated as indicated in Table 1 below. As shown in Table 1, inventive catalysts IC1 and IC2 were activated at ramp rates of 0.2°/min and 0.9°/min, respectively, while comparative catalysts CC1, CC2, and CC3 were activated at ramp rates of 0.1°/min.

TABLE 1

Activation Conditions for Catalysts in Example 1

| Catalyst | $H_2$:CO Molar Ratio | Ramp Range, ° C. | Ramp Rate, °/min | Pressure, psig | Hold Time, h | Space Velocity, nL/h/g cat |
|---|---|---|---|---|---|---|
| IC1 | 1 | 230-270 | 0.2 | 140 | 10 | 1.8 |
| IC2 | 1 | 230-270 | 0.9 | 140 | 10 | 1.8 |
| CC1 | 1 | 230-270 | 0.1 | 140 | 5 | 1.8 |
| CC2 | 1 | 230-270 | 0.1 | 140 | 10 | 1.8 |
| CC3 | 1 | 230-270 | 0.1 | 140 | 7.5 | 1.8 |

Figure 2:
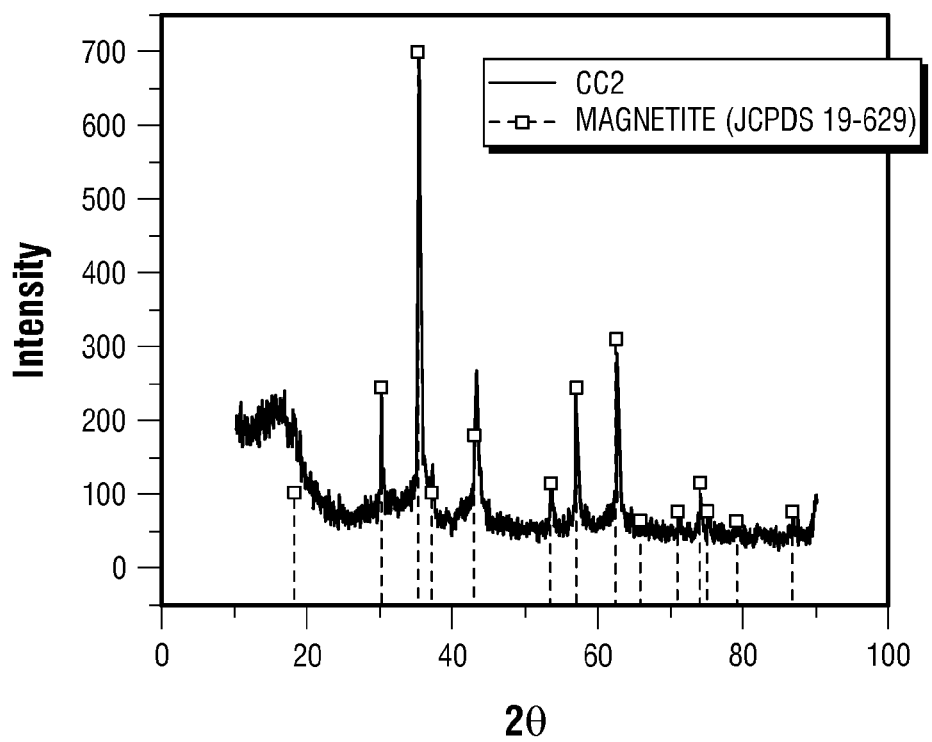
FIG. 2 is an X-ray diffraction pattern showing normalized intensity as a function of degree angle (2θ) for comparative catalyst CC2.
Figure 3:
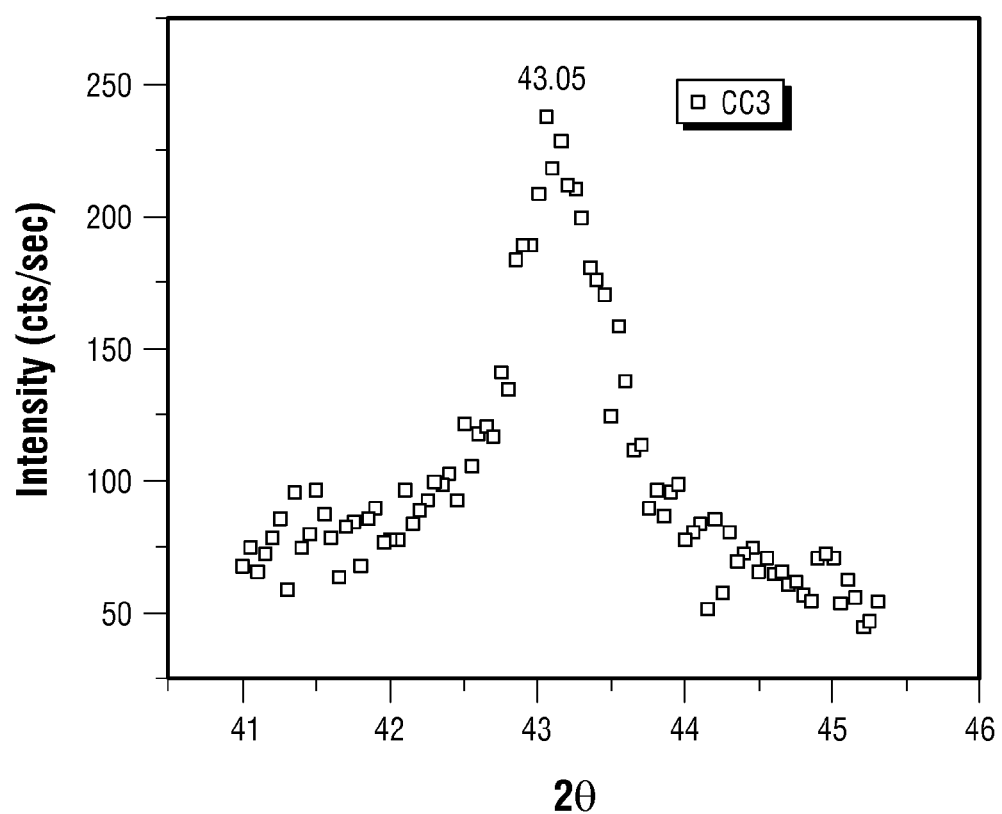
FIG. 3 is an X-ray diffraction pattern showing normalized intensity as a function of degree angle (2θ) for comparative catalyst CC3.

X-ray diffraction studies of the comparative and inventive catalysts listed in Table 1 were completed. Cu Kα radiation was utilized to determine angles of X-ray diffraction reflections. The powder diffractometer utilized Bragg-Bretano geometry. One of skill in the art of X-ray diffraction will recognize that the use of a different anode to generate the X-rays, say a Co tube, would lead to a shift in the below-reported angles by calculable amounts. FIG. 1 is a rapid scan X-ray diffraction pattern of inventive catalyst IC1. Each strong reflection of magnetite appears in the diffraction pattern of FIG. 1, and no reflections are observed that cannot be assigned to magnetite. However, the (400) reflection is consistently more intense than it would be if only magnetite were contributing to intensity at that angle (about 43.1° 2θ). FIG. 2 is an X-ray diffraction pattern of comparative catalyst CC2. The squares in FIG. 2 indicate magnetite reflections according to JCPDS 19-629. FIG. 3 is an X-ray diffraction pattern of comparative catalyst CC3. The rapid scans of FIGS. 1-3 were obtained by a step scan method, where the scan time was 2 seconds and the step size was 0.05° 2θ. Some intensities and angles are tabulated in Table 2.

TABLE 2

Tabulated Intensities and Angles for Catalysts of Example 1 and FIGS. 1-3

| JCPDS 00-019-629 | | JCPDS 03-065-3107 | | IC1 | | IC2 | | CC1 | | CC2 | | CC3 | |
|---|---|---|---|---|---|---|---|---|---|---|---|---|---|
| 2θ | $I_{rel}$ | 2θ | $I_{rel}$ | 2θ | $I_{rel}$ | 2θ | $I_{rel}$ | 2θ | $I_{rel}$ | 2θ | $I_{rel}$ | 2θ | $I_{rel}$ |
| 30.10 | 26 | 30.10 | 24 | 30.05 | 8 | 30.15 | 26 | 30.05 | 26 | 30.10 | 32 | 30.10 | 26 |
| 35.42 | 100 | 35.45 | 100 | 35.35 | 100 | 35.60 | 100 | 35.45 | 100 | 35.50 | 100 | 35.45 | 100 |
| 37.05 | 8 | 37.09 | 8 | 37.15 | 7 | ND[1] | ND[1] | ND[1] | ND[1] | 37.10 | 1 | ND[1] | ND[1] |
| 43.05 | 24 | 43.09 | 25 | 43.05 | 31 | 43.25 | 32 | 43.10 | 39 | 43.15 | 51 | 43.05 | 54 |
| 53.39 | 15 | 53.46 | 12 | 53.45 | 10 | 53.65 | 7 | 53.65 | 15 | 53.50 | 20 | 52.88 | NI[2] |
| 56.94 | 47 | 56.98 | 40 | 57.05 | 31 | 57.20 | 12 | 57.07 | 43 | 57.05 | 42 | 57.05 | 33 |
| 62.52 | 68 | 62.57 | 62 | 62.6 | 62 | 62.86 | 22 | 62.75 | 65 | 62.65 | 58 | 62.7 | 40 |

[1]ND: Not Determined
[2]NI: Not integrable: Origin 7.5 could not successfully integrate the peak that the eye could discern, due to low S/N (signal to noise ratio).

The datasets were moved into Origin 7.5, each observable reflection was isolated, a baseline determined, and the reflections integrated. The intensities were collected and relative intensities with respect to magnetite (311), the most intense magnetite reflection, were calculated. Deactivation rates were obtained by extended time runs in CSTR. The deactivation studies were performed by loading 12.0 grams of calcined catalyst with composition 100 Fe/5Cu/3.8K/12SiO$_2$ (w/w/w/w), together with 500 grams of SPECTRASYN™ oil (available from Intercontinental Lubricants Corp. of Brookfield, Conn.) into a two liter CSTR. Activation was conducted with the indicated ramp rates, and a pressure of 140 psig. Reaction was conducted at 255° C., 350 psig, a space velocity of 4.13 Normal liter/hr/g Fe, and inlet H$_2$:CO=1. The relative intensities of the magnetite (400) reflections to the magnetite (311) reflections, or $I_{rel}$, along with the deactivation rates observed in the CSTR studies are presented in Table 3.

TABLE 3

Relative Intensities and Deactivation Rates of Catalysts in Example 1

| Catalyst | $I_{rel}$ [Fe$_3$O$_4$(400)/Fe$_3$O$_4$(311)] | Deactivation Rate |
|---|---|---|
| IC1 | 31 | 0%/week first 700 hours |
| IC2 | 32 | 0%/week |
| CC1 | 39 | 6.6%/week |
| CC2 | 51 | 1.6%/week for 400 hrs, then 5.3%/week |
| CC3 | 54 | Not available, predicted to be high |

The relative intensities $I_{rel}$ reported in Table 3 are integrated intensities for the reflection assigned as magnetite (400) divided by the intensity of the reflection for that sample that is assigned as magnetite (311). The 311 reflection of magnetite diffracts X-radiation more strongly than any other reflection in these materials. For pure magnetite, the reported $I_{rel}$ values for (400)/(311) are reported to be 24.0 (JCPDS 00-019-0629) or 25.0 (JCPDS 00-065-3107). Calculations using PowderCell indicate $I_{rel}$ for (400)/(311) is about 20. Without wishing to be limited by theory, it is believed that relative intensities for this reflection greater than about 25 may be due to the coexistence of enough crystalline material (possibly, but without limitation, $\chi$-Fe$_5$C$_2$) to cause the intensity to be higher than that expected for magnetite alone. The relative intensities of three strong reflections, namely those at about 30.10° 2θ, 56.94° 2θ, and 62.52° 2θ of magnetite occur at the expected relative intensity ratios. Due to the availability of only small amounts of these samples, samples were mounted on sticky tape attached to a glass slide. The use of a very thin sample may lead to violations of the constant volume approximation. Consequently, measured intensities at higher angles may be systematically low. Intensities below about 50° 2θ should not be significantly affected by constant volume approximation violations. Material IC2 shows the expected magnetite intensity at 30.15° 2θ, but may exhibit constant volume violations manifested by lower than expected intensities at 57.2 and 62.8° 2θ. Durable catalyst performance was associated with $I_{rel}$ of magnetite less than 39 for the (400) reflection at about 43.2° 2θ.

It thus appears that the experimental catalyst comprises magnetite and another crystalline component. Without wishing to be limited by theory, the other crystalline component is believed to comprise $\chi$-Fe$_5$C$_2$. Magnetite occurs in a cubic space group and its index reflection, (311), has a multiplicity factor of 24. On the other hand, the index reflection for $\chi$-Fe$_5$C$_2$ (analyzed in a monoclinic crystal system) is 510 and the multiplicity factor of this reflection is 4. All else equal, the index reflection of magnetite should be about 6 times stronger than that of $\chi$-Fe$_5$C$_2$. Density effects ($\chi$-Fe$_5$C$_2$ is more dense than Fe$_3$O$_4$, so at constant volume that mass of $\chi$-Fe$_5$C$_2$ sampled by X-radiation is greater than the mass of magnetite sampled) offsets this somewhat, so one might expect a scale factor of 4-6. Experimentally, this factor was found to be about 2. The lower factor is consistent with preferential destruction of $\chi$-Fe$_5$C$_2$ by oxidation, which may occur during sample preparation.

Given the general belief that $\chi$-Fe$_5$C$_2$ is an active phase in Fischer-Tropsch synthesis, one would expect that increasing its surface area in particular would be beneficial. The X-ray diffraction results, combined with Mössbauer results, indicated that this indeed can occur. The iron-based catalysts studied contained similar amounts of carbide and magnetite, according to Mössbauer spectroscopy. Catalysts having relatively larger amounts of anomalous magnetite (400) diffraction intensity, which is theorized, without limitation, to be assignable to the presence of a significant amount of rather crystalline, larger crystallites (such as $\chi$-Fe$_5$C$_2$), exhibited reduced durability. The less of the crystalline, larger crystallite size material (e.g., $\chi$-Fe$_5$C$_2$), the more durable the catalyst.

A reflection which may be assignable to the 0 2 0 reflection (monoclinic cell) of $\chi$-Fe$_5$C$_2$ is observed at about 39.05° 2θ in both IC1 and CC2, which is a bit lower in angle than the 39.38° 2θ reported in JCPDS 36-1248 or predicted from PowderCell calculations for this reflection (39.39° 2θ predicted). This discrepancy in angle indicates that, while it is theorized that the excess intensity is due to 0 2 0 $\chi$-Fe$_5$C$_2$, it may be due to an unassigned phase. This feature shows about 40% more intensity in CC2 than in IC1, consistent with the idea that $\chi\text{-}Fe_5C_2$ contributes to anomalously high intensity of magnetite (400). Although postulated to be the contribution of $\chi\text{-}Fe_5C_2$, there could be another phase contributing with or rather than $\chi\text{-}Fe_5C_2$. For example, the excess intensity may be contributed by quartz, cristabolite, or other crystalline silica phases. The source of the anomalously high magnetite (400) intensity in the iron catalysts that deactivate is not definitively known, however, the presence of the excess intensity can be correlated with a less durable catalyst (regardless of the source of the excess magnetite (400) intensity).

Apparent crystallite sizes were also determined for magnetite (311), (400), (511), and (440) reflections from the fast scan data, and the results are reported in Table 4. The half-width of reflections were determined in Origin 7.5, and an internet widget was used to apply the Scherrer equation to estimate the size of coherent domains along different directions (also referred to as crystallite size).

TABLE 4

Apparent Crystallite Sizes of Various Magnetite Reflections of Catalysts of Example 1

| Catalyst | $D_p$ 43.1 (400) | $D_p$ 35.4 (311) | $D_p$ 511 (511) | $D_p$ 62.6 (440) |
|---|---|---|---|---|
| IC1 | 16 | 24 | 25 | 23 |
| IC2 | 16 | 23 | 23 | 22 |
| CC1 | 18 | 28 | 25 | 24 |
| CC2 | 18 | 30 | 33 | 21 |
| CC3 | 12 | 25 | 18 | 19 |

The estimates in Table 4, which are not corrected for instrumental line broadening (which typically becomes important as crystallite sizes approach 50 nm), were calculated using the internet widget: http://www.d.umn.edu/~bhar0022/dpcalculator/index.php, the correct implementation thereby of the Scherrer equation was verified. The largest observed crystallite size was 33 nm, so omission of instrumental line broadening effects is deemed an adequate approximation. The $D_p$ for the 43.1° 2θ reflection was smaller than that obtained along other directions, with the (400) reflection exhibiting smaller apparent crystallite sizes, in the range of 12-18 nm. The other three reflections all reported apparent crystallite sizes in the range of from 18-33 nm. CC3 showed relatively small (511) and (440) crystallite sizes (18 and 19 nm respectively) and the smallest (400) crystallite size (12 nm). The other four materials reported (400) crystallite sizes in the range of 16-18 nm, while the other reflections were in the range of 22-33 nm. Magnetite crystallizes in a cubic crystal system. It is not expected that crystallites will not vary substantially in size as one goes from one direction to another.

Thus, the magnetite (400) reflections of the activated materials exhibited greater intensity than expected for magnetite alone, and the apparent crystallite size, calculated using the Scherrer equation and assuming, implicitly, that the reflection assigned as magnetite (400) was in fact a single reflection, indicated smaller crystallite sizes than those found for the (311), (511), or (440) reflections of magnetite. That is, the (400) reflection was anomalously broad. The anomalously high relative intensities of the (400)/(311) reflections than expected for magnetite alone, and the anomalously broad line width suggest that there may be additional reflections occurring at this angle besides magnetite (400). Without wishing to be limited by theory, it is postulated that $\chi\text{-}Fe_5C_2$ also contributes intensity at this angle. It is known that $\chi\text{-}Fe_5C_2$ has several reflections at about this angle. (The number of reflections depends on whether one considers this material to occur in a monoclinic or triclinic cell.) For example, PowderCell calculations based on du Plessis unit cell space group and fractional coordinates indicate that $\chi\text{-}Fe_5C_2$ has seven strong reflections near magnetite (400). For example, near 41.2° 2θ and 50.1° 2θ. Intensity contributions from coherent scattering by $\chi\text{-}Fe_5C_2$ (and/or another contributor) could increase apparent intensity and also increase line width, since, for example, $\chi\text{-}Fe_5C_2$ reflections are expected at slightly higher angle than magnetite (400).

Catalysts IC1 and CC2 were further studied by utilizing (1) a 14 hour and 15 minute protocol in which data was collected in 0.05° steps with 15 second dwells at 34-37° 2θ, and with the same step but 180 second dwells from 38-52° 2θ; and (2) higher quality broad scans from 15-75° 2θ with 25 second dwells. X-ray diffraction patterns of the 38-52° 2θ regions of IC1 and CC2 are presented in FIGS. 4 and 5, respectively. Again, the magnetite (400) relative intensity anomaly is observed in the higher quality data. The intensity of the (400) reflection to the (311) reflection is 31.2% for IC1, and 62.0% for CC2. Again, the material that deactivates exhibits more excess intensity at the magnetite (400) feature. These results are in very good agreement with the fast scan results above.

Figure 6:
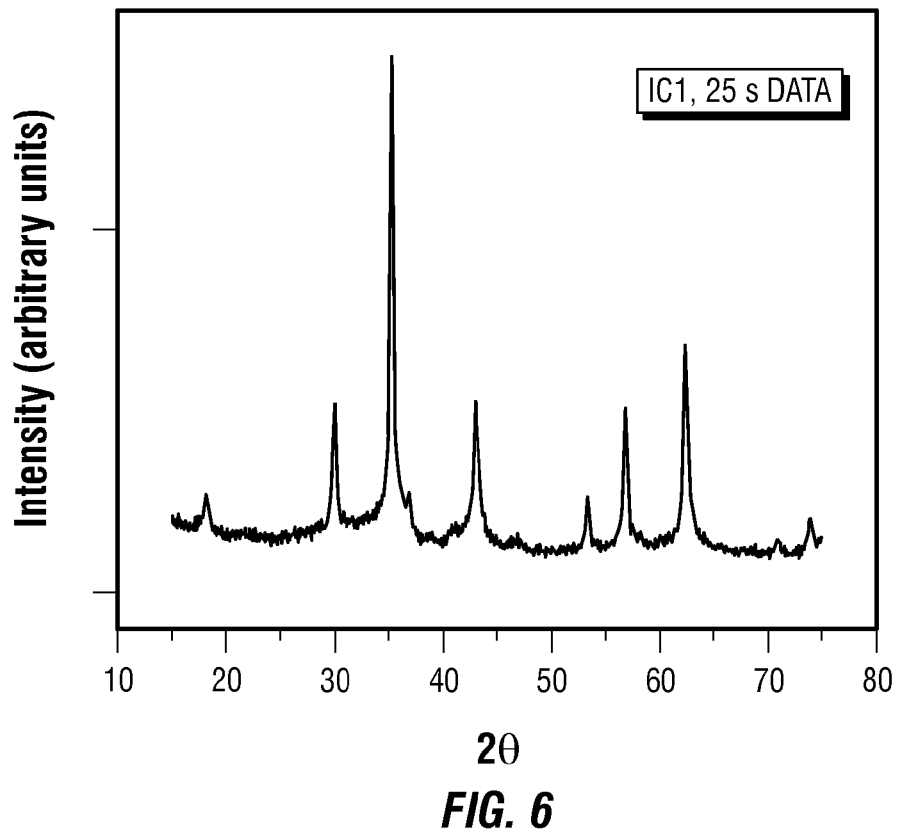
FIG. 6 is an X-ray diffraction pattern showing normalized intensity as a function of degree angle (2θ) for inventive catalyst IC1 according to an embodiment of this disclosure.
Figure 7:
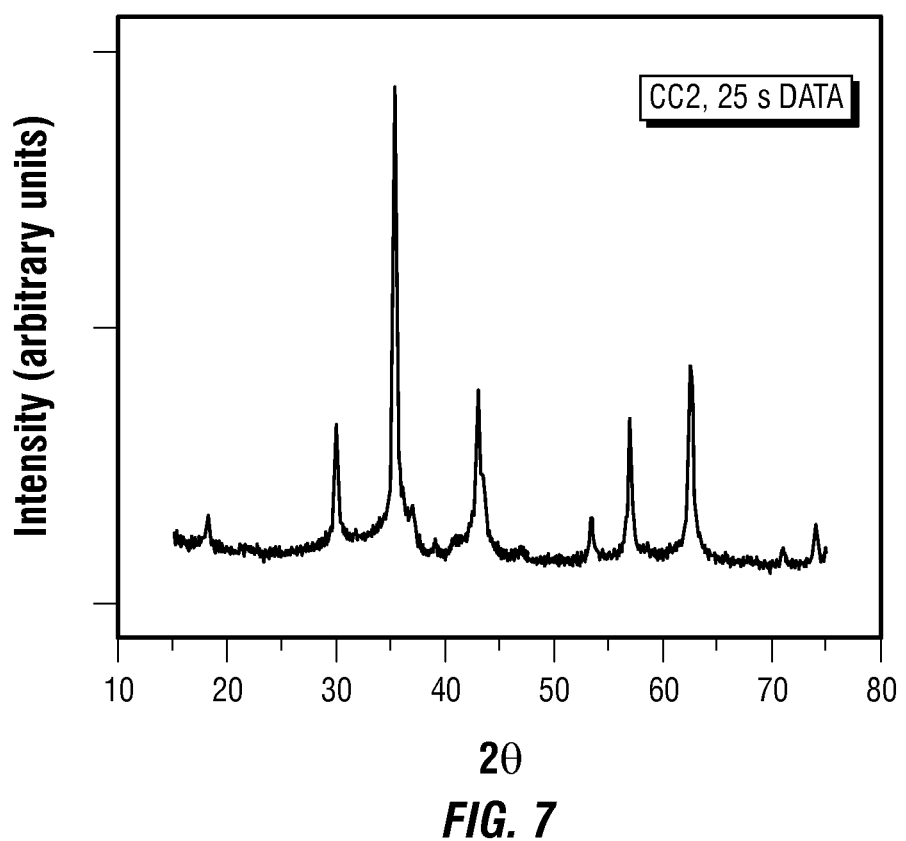
FIG. 7 is an X-ray diffraction pattern showing normalized intensity as a function of degree angle (20θ) for comparative catalyst CC2.

X-ray diffraction results for inventive catalyst IC1 and comparative catalyst CC2 from the broader scans collected with 25 second dwells are presented in FIGS. 6 and 7, respectively. These datasets confirm that, except for two weak, isolated reflections assignable to $\chi\text{-}Fe_5C_2$ (at about 39.1 and 58.5° 2θ), there are no other observed reflections.

The conditions utilized to obtain the data in FIGS. 1-7 are tabulated in Table 5.

TABLE 5

Diffractomer Settings for Data in FIGS. 1-7 of Example 1

Figure 4:
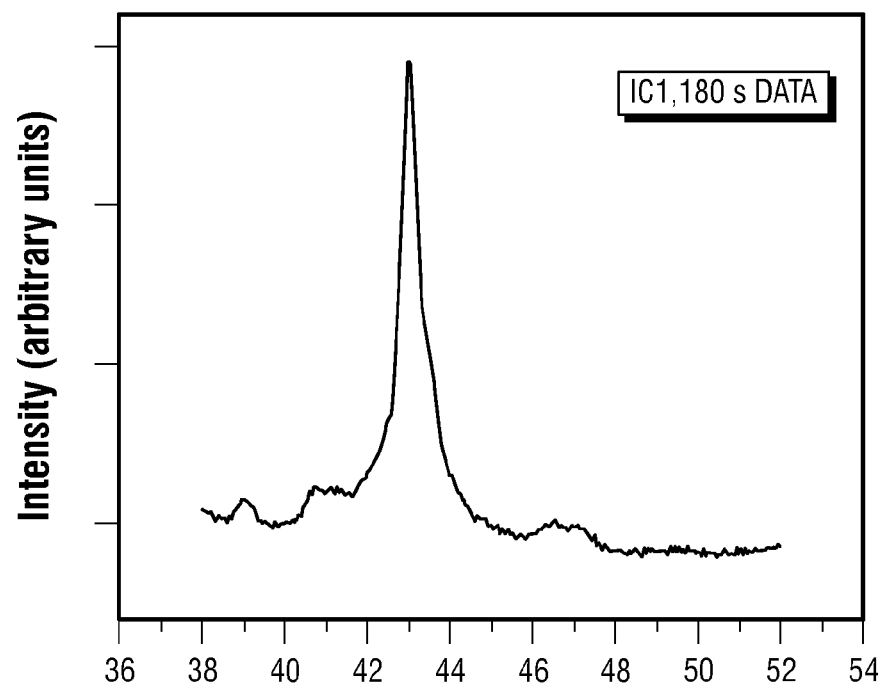
FIG. 4 is an X-ray diffraction pattern showing normalized intensity as a function of degree angle (2θ) for inventive catalyst IC1 according to an embodiment of this disclosure.
Figure 5:
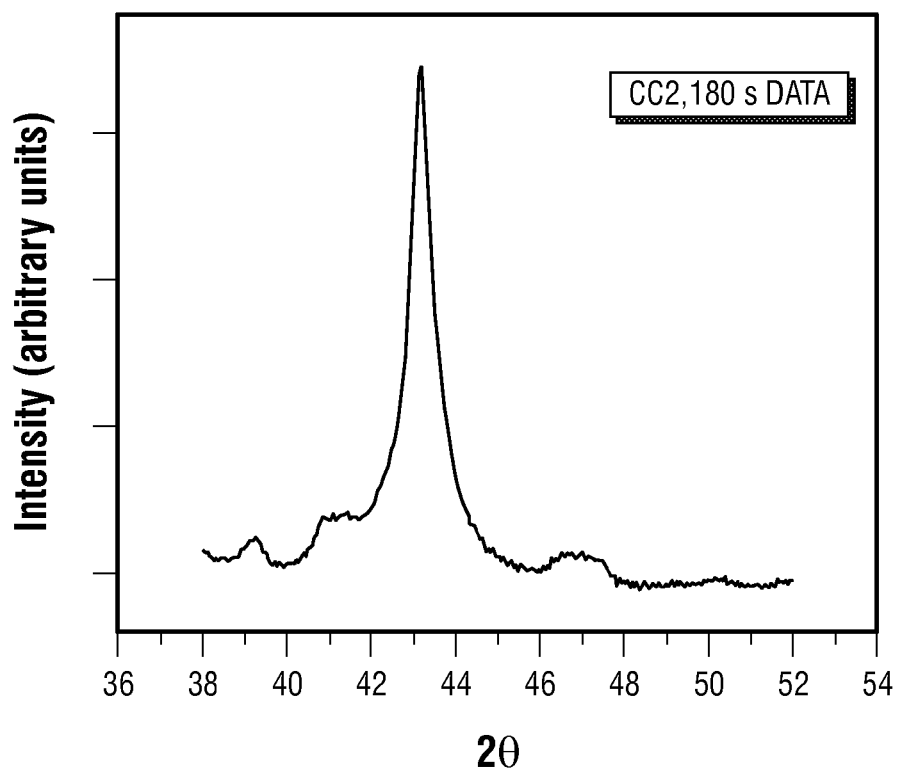
FIG. 5 is an X-ray diffraction pattern showing normalized intensity as a function of degree angle (2θ) for comparative catalyst CC2.

| Scan Parameters: | |
|---|---|
| Range (2θ) | 10.00-90.00 (FIGS. 1-3), 35.00-37.00° 2θ Sequence 1, FIGS. 4&5, 38.25-52.00° 2θ Sequence 2, FIGS. 4&5 (only Sequence 2 data shown in FIGS. 4&5) |
| Step size (2θ) | 0.05 (FIG. 1-5) |
| Time per step (s) | 2.0 (FIG. 1-3), 15.00 FIGS. 4&5 Sequence 1, 180.00 seconds FIGS. 4&5 Sequence 2 |
| Number of data points | 1601 (FIGS. 1-3), 61 Sequence 1, FIGS. 4&5, 281 Sequence 2, FIGS. 4&5 |
| Minimum (counts) | 0.00 |
| Maximum (counts) | 680 (FIG. 1), 690 (FIG. 2), 515 (FIG. 3), 3068 FIG. 4 Sequence 1, 19592, FIG. 4 Sequence 2 |
| Scan mode | Step scan |
| Diffractometer, Configuration & Settings: | |
| Control unit | PW3710 |
| Goniometer | PW1050 |
| Generator | PW1830/00 |
| Generator tension (kV) | 40 |
| Generator current (mA) | 40 |
| X-ray tube | PW2773 Cu Long Fine Focus |
| Tube focus | Line |
| Take off angle(°) | 6.0000 |
| Divergence slit | Fixed slit 1° |
| Incident beam radius (mm) | 173.00 |
| Incident bead soller slit | 0.04 rad |
| Diffracted beam radius (mm) | 173.00 |
| Receiving slit height | Fixed slit 0.2 mm |
| Detector | PW3011 |

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, and so forth). Use of the term 'optionally' with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The disclosures of all patents, patent applications, and publications cited herein are hereby incorporated by reference, to the extent they provide exemplary, procedural or other details supplementary to those set forth herein.

What is claimed is:

1. An iron-based Fischer-Tropsch catalyst, the iron-based Fischer-Tropsch catalyst comprising magnetite and characterized by integrable X-ray diffraction reflections corresponding to (311), (511), (440), and (400), such that the ratio of the intensity of the (400) reflection to the intensity of the (311) reflection is less than about 39%.

2. The iron-based Fischer-Tropsch catalyst of claim 1, wherein the ratio of the intensity of the (400) reflection to the (311) reflection is less than about 37%.

3. The iron-based Fischer-Tropsch catalyst of claim 1, wherein the ratio of the intensity of the (400) reflection to the (311) reflection is less than about 35%.

4. The iron-based Fischer-Tropsch catalyst of claim 1, wherein the ratio of the intensity of the (400) reflection to the (311) reflection is less than about 33%.

5. The iron-based Fischer-Tropsch catalyst of claim 1, wherein the ratio of the intensity of the (511) reflection, the (440) reflection, or both, relative to the (311) reflection is within the range expected for magnetite.

6. The iron-based Fischer-Tropsch catalyst of claim 1, wherein the ratio of the intensity of the (511) reflection relative to the (311) reflection is in the range of from about 24 to about 29, the ratio of the intensity of the (440) reflection relative to the (311) reflection is in the range of from about 44 to about 68, or both.

7. The iron-based Fischer-Tropsch catalyst of claim 1 further comprising $\chi$-$Fe_5C_2$.

8. The iron-based Fischer-Tropsch catalyst of claim 1 having a deactivation rate of less than about 1%/week for at least 400 hours.

9. The iron-based Fischer-Tropsch catalyst of claim 1 having a deactivation rate of less than about 1%/week for at least 700 hours.

10. The iron-based Fischer-Tropsch catalyst of claim 1, wherein the catalyst is a precipitated iron catalyst further comprising copper and potassium.

11. The iron-based Fischer-Tropsch catalyst of claim 1 comprising, per 100 g Fe, from about 1 g to about 6 g copper.

12. The iron-based Fischer-Tropsch catalyst of claim 11 further comprising, per 100 g Fe, from about 1 g to about 6 g potassium.

13. The iron-based Fischer-Tropsch catalyst of claim 12 further comprising, per 100 g Fe, from about 6 g to about 30 g silica.

14. The iron-based Fischer-Tropsch catalyst of claim 1, wherein the catalyst provides more than 1000 hours of catalytic activity on stream, with a carbon monoxide conversion of at least 85%.

15. The iron-based Fischer-Tropsch catalyst of claim 1, wherein the catalyst produces Fischer-Tropsch synthesis products with an average alpha value of at least 0.95.

16. The iron-based Fischer-Tropsch catalyst of claim 1, wherein the catalyst produces Fischer-Tropsch synthesis products with a carbon dioxide selectivity of less than 40 mole percent (±3 mole percent).

17. The iron-based Fischer-Tropsch catalyst of claim 1, wherein the catalyst produces Fischer-Tropsch synthesis products with a methane selectivity of less than 1.5 mole percent.

18. A method of preparing an activated iron-based Fischer-Tropsch catalyst, the method comprising:
providing a precipitated catalyst comprising oxides including at least iron oxide; and
activating the precipitated catalyst to provide the activated iron-based Fischer-Tropsch catalyst,
wherein activating the precipitated catalyst comprises exposing the precipitated catalyst to an activation gas, and increasing the temperature from a first temperature to a second temperature at a ramp rate, whereby the ratio of the intensity of the (400) reflection of the activated iron-based Fischer-Tropsch catalyst to the intensity of the (311) reflection thereof is less than 38%.

19. The method of claim 18, wherein the ratio of the intensity of the (400) reflection of the activated iron-based Fischer-Tropsch catalyst to the intensity of the (311) reflection thereof is less than about 37%.

20. The method of claim 18, wherein the ratio of the intensity of the (400) reflection of the activated iron-based Fischer-Tropsch catalyst to the intensity of the (311) reflection thereof is less than about 35%.

21. The method of claim 18, wherein the ratio of the intensity of the (400) reflection of the activated iron-based Fischer-Tropsch catalyst to the intensity of the (311) reflection thereof is less than about 33%.

22. The method of claim 18, wherein the ratio of the intensity of the (400) reflection of the activated iron-based Fischer-Tropsch catalyst to the intensity of the (311) reflection thereof is in the range of from 0% to 38%.

23. The method of claim 18, wherein the ratio of the intensity of the (400) reflection of the activated iron-based Fischer-Tropsch catalyst to the intensity of the (311) reflection thereof is greater than or equal to about 18%.

24. The method of claim 23, wherein the ratio of the intensity of the (400) reflection of the activated iron-based Fischer-Tropsch catalyst to the intensity of the (311) reflection thereof is about 20%.

25. The method of claim 18, wherein the ratio of the intensity of the (400) reflection of the activated iron-based Fischer-Tropsch catalyst to the intensity of the (311) reflection thereof is greater than 24%.

26. The method of claim 18, wherein the ratio of the intensity of the (400) reflection of the activated iron-based Fischer-Tropsch catalyst to the intensity of the (311) reflection thereof is greater than 25%, indicating a contribution from a component other than magnetite.

27. The method of claim 18, wherein the ratio of the intensity of at least one reflection selected from the group consisting of the (440) reflection and the (511) reflection of the activated iron-based Fischer-Tropsch catalyst to the intensity of the (311) reflection thereof is within the range expected for magnetite.

28. The method of claim 18, wherein the ramp rate is greater than 0.1° F./minute (0.06° C./minute).

29. The method of claim 18, wherein the ramp rate is in the range of from about 0.15° F./minute (0.08° C./minute) to about 1.5° F./minute (0.83° C./minute).

30. The method of claim 29, wherein the ramp rate is in the range of from about 0.2° F./minute (0.11° C./minute) to about 1° F./minute (0.56° C./minute).

31. The method of claim 30, wherein the ramp rate is in the range of from about 0.2° F./minute (0.11° C./minute) to about 0.9° F./minute (0.5° C./minute).

32. The method of claim 18, wherein the second temperature is in the range of from about 250° C. to about 290° C.

33. The method of claim 32, wherein the first temperature is in the range of from about 210° C. to about 250° C.

34. The method of claim 32, wherein the second temperature is in the range of from about 260° C. to about 280° C.

35. The method of claim 34, wherein the second temperature is in the range of from about 265° C. to about 275° C.

36. The method of claim 18, wherein the second temperature is about 270° C.

37. The method of claim 18, wherein the activation gas is selected from the group consisting of carbon monoxide, hydrogen, and combinations thereof.

38. The method of claim 37, wherein the activation gas comprises synthesis gas having a molar ratio of hydrogen to carbon monoxide in the range of from about 0.7 to about 1.5.

39. The method of claim 38, wherein the activation gas comprises synthesis gas having a molar ratio of hydrogen to carbon monoxide of about 1.

40. The method of claim 18, wherein the precipitated catalyst is exposed to activation gas at a space velocity in the range of from about 1.5 mL/h/g catalyst to about 2.5 mL/h/g catalyst.

41. The method of claim 40, wherein the precipitated catalyst is exposed to activation gas at a space velocity in the range of from about 1.7 mL/h/g catalyst to about 2.0 mL/h/g catalyst.

42. The method of claim 41, wherein the precipitated catalyst is exposed to activation gas at a space velocity of about 1.8 mL/h/g catalyst.

43. The method of claim 18, wherein the precipitated catalyst further comprises potassium oxides, copper oxides, or both.

44. The method of claim 18, wherein providing a precipitated catalyst further comprises precipitating iron oxide and optionally copper oxide by combination of a precipitant with a solution selected from the group consisting of iron nitrate solutions, and solutions comprising both iron and copper nitrates.

45. The method of claim 44, wherein providing a precipitated catalyst further comprises preparing a solution comprising iron nitrate by dissolving iron metal in a liquid comprising water, nitric acid, or both.

46. The method of claim 44, wherein providing a precipitated catalyst further comprises promoting the precipitated material with at least one promoter.

47. The method of claim 46 further comprising washing the precipitated material prior to promotion thereof.

48. The method of claim 46 wherein promoting the precipitated material further comprises combining the precipitated material with a promoter selected from the group consisting of compounds comprising potassium and compounds comprising silicon.

49. The method of claim 48, wherein the promoter comprises potassium, silica, or both.

50. The method of claim 49, wherein the promoter comprises fumed silica and potassium hydroxide.

51. The method of claim 44, wherein the precipitant is selected from basic solutions.

52. The method of claim 51, wherein the basic solution is selected from the group consisting of sodium hydroxide, sodium carbonate, sodium bicarbonate, potassium hydroxide, potassium carbonate, and combinations thereof.

53. The method of claim 52, wherein the basic solution comprises sodium carbonate.

54. The method of claim 44, wherein providing a precipitated catalyst comprising oxides including at least iron oxide further comprises drying the precipitated material, sizing the precipitated material, or both.

55. The method of claim 54, wherein sizing the precipitated material further comprises spray drying the precipitated material, optionally subsequent to drying.

56. The method of claim 55, wherein the spray dried precipitated catalyst particles are substantially spherical, and have an average particle size in the range of from about 40 μm to about 50 μm.

57. The method of claim 44, wherein providing a precipitated catalyst comprising oxides including at least iron oxide further comprises calcining the precipitated material, optionally subsequent to spray drying.

58. The method of claim 57, wherein calcining comprises increasing the temperature from a starting temperature to a first intermediate temperature at a starting ramp rate and holding at the first intermediate temperature for a first dwell time, increasing the temperature from the first intermediate temperature to a second intermediate temperature at a first intermediate ramp rate and holding at the second intermediate temperature for a second dwell time, increasing the temperature from the second intermediate temperature to a final temperature at a final ramp rate and holding at the final temperature for a third dwell time.

59. The method of claim 58, wherein the starting temperature is about room temperature, the first intermediate temperature is in the range of from about 130° C. to about 160° C., the second intermediate temperature is in the range of from about 190° C. to about 210° C., and the final temperature is in the range of from about 280° C. to about 320° C.

60. The method of claim 59, wherein at least one dwell time selected from the group consisting of the first dwell time, the second dwell time, and the third dwell time is in the range of from about 2 hours to about 6 hours.

61. The method of claim 59, wherein at least one ramp rate selected from the group consisting of the starting ramp rate, the first intermediate ramp rate, the second intermediate ramp rate, and the final ramp rate is in the range of from about 0.4° C. to about 0.6° C.

62. An activated iron-based Fischer-Tropsch catalyst produced by:
providing a precipitated catalyst comprising oxides including at least iron oxide; and
activating the precipitated catalyst to provide the activated iron-based Fischer-Tropsch catalyst, wherein activating the precipitated catalyst comprises exposing the precipitated catalyst to an activation gas, and increasing the temperature from a first temperature to a second temperature at a ramp rate, wherein the iron-based Fischer-Tropsch catalyst comprises magnetite, and is characterized by integrable X-ray diffraction reflections corresponding to (311), (511), (440), and (400), and wherein the ratio of the intensity of the (400) reflection to the intensity of the (311) reflection is less than about 39%.

63. The activated iron-based Fischer-Tropsch catalyst of claim 62 comprising, per 100 g iron, from about 3 g to about 7 g copper, from about 1 g to about 6 g potassium, from about 10 g to about 24 g silica, or any combination thereof.

64. An activated iron-based Fischer-Tropsch catalyst produced by:
  providing a precipitated catalyst comprising oxides including at least iron oxide; and
  activating the precipitated catalyst to provide the activated iron-based Fischer-Tropsch catalyst,
  wherein activating the precipitated catalyst comprises exposing the precipitated catalyst to an activation gas, and increasing the temperature from a first temperature to a second temperature at a ramp rate, whereby the ratio of the intensity of the (400) reflection of the activated iron-based Fischer-Tropsch catalyst to the intensity of the (311) reflection thereof is less than 38%, and wherein the iron-based Fischer-Tropsch catalyst comprises $100Fe/5Cu/3.8K/12SiO_2$ (w/w/w/w).

* * * * *